US012264851B2

(12) United States Patent
Crossley et al.

(10) Patent No.: US 12,264,851 B2
(45) Date of Patent: Apr. 1, 2025

(54) GEOTHERMAL PLANT FOR EXTRACTING ENERGY FROM A GEOTHERMAL RESERVOIR LOCATED BELOW THE OCEAN BOTTOM

(71) Applicant: CGG SERVICES SAS, Massy (FR)

(72) Inventors: Robert Crossley, Conwy (GB);
Rebecca Bolton, Conwy (GB);
Jonathon Hardman, LLandudno (GB);
Elisha Drumm, Bridge of Weir (GB);
Mark Williams, LLandudno (GB);
Mohammad Nassir, Calgary (CA)

(73) Assignee: CGG SERVICES SAS, Massy (FR)

( * ) Notice: Subject to any disclaimer, the term of this patent is extended or adjusted under 35 U.S.C. 154(b) by 0 days.

(21) Appl. No.: 18/262,063

(22) PCT Filed: Mar. 11, 2022

(86) PCT No.: PCT/IB2022/000131
§ 371 (c)(1),
(2) Date: Jul. 19, 2023

(87) PCT Pub. No.: WO2022/214867
PCT Pub. Date: Oct. 13, 2022

(65) Prior Publication Data
US 2024/0085065 A1  Mar. 14, 2024

Related U.S. Application Data

(60) Provisional application No. 63/171,169, filed on Apr. 6, 2021.

(51) Int. Cl.
*F24T 10/20* (2018.01)
*B01D 19/00* (2006.01)
(Continued)

(52) U.S. Cl.
CPC .......... *F24T 10/20* (2018.05); *B01D 19/0068* (2013.01); *C25B 1/042* (2021.01);
(Continued)

(58) Field of Classification Search
None
See application file for complete search history.

(56) References Cited

U.S. PATENT DOCUMENTS 4,059,959 A * 11/1977 Matthews ................ F03G 7/04
261/DIG. 11
4,121,352 A * 10/1978 Lameris ................ C10G 31/00
196/128

(Continued)

FOREIGN PATENT DOCUMENTS

CA      2789703 A1    8/2011
DE     10343544 A1    4/2005
(Continued)

OTHER PUBLICATIONS

DE 10343544 English language machine translation (Year: 2008).*
(Continued)

*Primary Examiner* — Wesley G Harris
(74) *Attorney, Agent, or Firm* — PATENT PORTFOLIO BUILDERS PLLC

(57) ABSTRACT

A geothermal plant, for extracting energy from a geothermal reservoir located below the ocean bottom, includes a floating platform; a riser that extends from a well drilled into the geothermal reservoir, to the floating platform; an electrical pump having a mechanical actuation part located in a bore of the riser, and an electronic part located outside the riser, wherein the electrical pump is configured to pump a geothermal liquid from the geothermal reservoir to the floating platform; and a power plant located on the floating platform and configured to use a steam produced by the geothermal (Continued)

liquid to generate electrical power. The electrical pump is placed at a depth of the riser where the geothermal liquid is in a single-phase.

19 Claims, 24 Drawing Sheets

(51) Int. Cl.
*C25B 1/042* (2021.01)
*E21B 41/00* (2006.01)
*F03G 4/00* (2006.01)
*F24T 10/30* (2018.01)
*F24T 10/40* (2018.01)
*F24T 50/00* (2018.01)

(52) U.S. Cl.
CPC ............ *E21B 41/005* (2013.01); *F03G 4/026* (2021.08); *F24T 10/30* (2018.05); *F24T 10/40* (2018.05); *F24T 50/00* (2018.05); *F24T 2201/00* (2018.05); *Y02E 60/36* (2013.01)

(56) References Cited

U.S. PATENT DOCUMENTS

| | | | | | |
|---|---|---|---|---|---|
| 4,356,401 | A | * | 10/1982 | Santi | F03G 7/04 290/1 R |
| 4,370,860 | A | * | 2/1983 | Assaf | F04F 1/18 60/641.11 |
| 6,073,448 | A | * | 6/2000 | Lozada | F24T 10/30 60/641.1 |
| 2006/0048770 | A1 | * | 3/2006 | Meksvanh | F24T 10/20 126/620 |
| 2010/0000214 | A1 | * | 1/2010 | Nagurny | F03G 7/05 60/641.2 |
| 2010/0045042 | A1 | * | 2/2010 | Hinders | F28D 9/0006 204/194 |
| 2010/0077749 | A1 | * | 4/2010 | Riley | F24T 10/20 60/641.2 |

FOREIGN PATENT DOCUMENTS

| | | | | |
|---|---|---|---|---|
| DE | 10343544 | B4 * | 5/2008 | F03D 9/007 |
| DE | 102006062679 | A1 | 7/2008 | |
| DE | 102017001055 | A1 | 3/2018 | |
| GB | 2539026 | A | 12/2016 | |
| JP | 2011069207 | A * | 4/2011 | F03G 4/00 |
| WO | 2011100731 | A2 | 8/2011 | |

OTHER PUBLICATIONS

Gerardo Hiriart et al., "Submarine Geothermics; Hydrothermal Vents and Electricity Generation," Proceedings World Geothermal Congress 2010Bali, Indonesia, Apr. 25-29, 2010, pp. 1-6.
International Search Report/Written Opinion dated Sep. 12, 2022 in related/corresponding PCT Application No. PCT/IB2022/000131.
Jim Shnell et al., "Energy from Ocean Floor Geothermal Resources," Proceedings World Geothermal Congress 2015, Melbourne, Australia, Apr. 19-25, 2015, pp. 1-6.
Keir Becker et al., "New packer experiments and borehole logs in upper oceanic crust: Evidence for ridge-parallel consistency in crustal hydrogeological properties," Geochemistry Geophysics Geosystems, vol. 14, No. 8, Aug. 9, 2013, pp. 2900-2915.
Michelle Allsopp et al., "A scientific critique of oceanic iron fertilization as a climate change mitigation strategy," Greenpeace Research Laboratories Technical Note Jul. 2007, Sep. 2007, pp. 1-32.
Seung-Sep Kim et al., "New global seamount census from altimetry-derived gravity data," Geophysical Journal International, 2011, vol. 186, pp. 615-631.
Subir K. Sanyal et al., "Net Power Capacity of Geothermal Wells Versus Reservoir Temperature—A Practical Perspective," Proceedings, Thirty-Second Workshop on Geothermal Reservoir Engineering Stanford University, Stanford, California, Jan. 22-24, 2007, SGP-TR-183, 7 pages.
D.M. Kennedy et al., "The geomorphology of the flanks of the Lord Howe Island volcano, Tasman Sea, Australia," Deep-Sea Research II, Oct. 2011, vol. 58, No. 7, pp. 899-908.
Dominik Palgan et al., Volcanism and hydrothermalism on a hotspot-influenced ridge: Comparing Reykjanes Peninsula and Reykjanes Ridge, Iceland, Journal of Volcanology and Geothermal Research, Oct. 2017, vol. 348, pp. 62-81.
From Problem to Profit competition entry by Gøril Tjetland, 2017 Screen capture from YouTube video clip entitled "Harvest energy from ships," 2 pages, uploaded May 2017, by user "Nor-Shipping," Retrieved from Internet: https://www.youtube.com/watch.
Gerardo Hiriart et al., "Submarine Geothermal Generation," Proceedings World Geothermal Congress, Reykjavik, Iceland, Apr.-Oct. 2021, Abstract 1 page.
Guómundur Ó. Frióleifsson et al., "The Iceland Deep Drilling Project at Reykjanes: Drilling into the root zone of a black smoker analog," Journal of Volcanology and Geothermal Research, Elsevier Scientific Publishers, Amsterdam, NL, vol. 391, Aug. 31, 2018.
M Kinoshita et al., "Recharge/discharge interface of a secondary hydrothermal circulation in the Suiyo Seamount of the Izu-Bonin arc, identified by submersible-operated heat flow measurements", Earth and Planetary Science Letters, North Holland Publ Co, NL, vol. 245, No. 3-4, May 30, 2006, pp. 498-508.
First Examination Report dated Mar. 28, 2024 in related/corresponding Saudi Arabian Application No. 523450992.
International Preliminary Report on Patentability dated Oct. 10, 2023 in related/corresponding PCT Application No. PCT/IB2022/000131.

* cited by examiner

Water depth 3000m
Top reservoir below sea bed 250m
Reservoir thickness 500m
Reservoir porosity 10%

| time, month | Pw, kPa | Pw, kPa | Radius of investigation, m | Radius of investigation, m | Steam Flash depth | Steam Flash depth | Draw-down | Draw-down |
|---|---|---|---|---|---|---|---|---|
| | Reservoir permeability 50 mD | Reservoir permeability 100 mD | | | | | | |
| 0.1 | 27587 | 29933 | 1018 | 1440 | 889 | 654 | 4913 | 2567 |
| 12 | 26063 | 29171 | 11154 | 15774 | 1041 | 730 | 6437 | 3329 |
| 24 | 25843 | 29061 | 15774 | 22308 | 1063 | 741 | 6657 | 3439 |
| 36 | 25714 | 28997 | 19320 | 27322 | 1076 | 748 | 6786 | 3503 |
| 48 | 25622 | 28951 | 22308 | 31549 | 1085 | 753 | 6878 | 3549 |
| 59 | 25556 | 28918 | 24733 | 34977 | 1092 | 756 | 6944 | 3582 |

FIG. 14A

Water depth 3000m
Top reservoir below sea bed 250m
Reservoir thickness 500m
Reservoir porosity 20%

| | Reservoir permeability 50 mD | | | Reservoir permeability 100 mD | | | | |
|---|---|---|---|---|---|---|---|---|
| time, month | Pw, kPa | Radius of investigation | Pw, kPa | Radius of investigation | Steam Flash | Steam Flash | Draw-down | Draw-down |
| 0.1 | 27808 | 720 | 30044 | 1018 | 867 | 643 | 4692 | 2456 |
| 12 | 26284 | 7887 | 29282 | 11154 | 1019 | 719 | 6216 | 3218 |
| 24 | 26063 | 11154 | 29171 | 15774 | 1041 | 730 | 6437 | 3329 |
| 36 | 25934 | 19320 | 29107 | 19320 | 1054 | 737 | 6566 | 3393 |
| 48 | 25843 | 15774 | 29061 | 22308 | 1063 | 741 | 6657 | 3439 |
| 59 | 25777 | 17489 | 29028 | 24733 | 1070 | 745 | 6723 | 3472 |

FIG. 14B

GEOTHERMAL PLANT FOR EXTRACTING ENERGY FROM A GEOTHERMAL RESERVOIR LOCATED BELOW THE OCEAN BOTTOM

BACKGROUND

Technical Field

Embodiments of the subject matter disclosed herein relate to a system and method for screening the bottom of a body of water to determine where to drill one or more wells for reaching geothermal resources, and also for various systems that best take advantage of these geothermal resources for transforming their thermal energy into other forms of energy.

Discussion of the Background

A large proportion of the internal heat of our planet is released during the stretching and rifting of the Earth's lithosphere and crust, which leads to the formation of new oceanic crust, by volcanic activity in terrestrial and underwater settings and by a combination of conduction, convection and advection through the crust and overlying strata. This geothermal heat can be exploited to deliver electrical energy and heat energy with little or no release of carbon dioxide.

Onshore, the areas containing geothermally favorable geological settings for delivering electrical energy, such as volcanoes and active rifts, are limited. In addition, many of these areas are densely populated, which limits the potential for further geothermal development. However, progress is being made in exploiting the widely available but lower geothermal temperatures onshore for heating, but there remains a huge unfulfilled global need for large quantities of green electrical energy.

To address these shortcomings, there is a movement to access the large geothermal resources that are available offshore, i.e., at the ocean bottom, in the form of volcanos, or heat conduction. However, the volcanos are sometimes characterized by violent eruption and/or earthquakes, which is not desired for any industrial installation that might be used for extracting the heat from these geothermal resources. The existing heat conduction devices that are currently used to take advantage of this available heat are insignificant in size and are in their incipient phase. Thus, there is no commercially available system or method for determining where to place an industrial installation for extracting the geothermal heat, and also there is no commercially available industrial installation that can extract the geothermal heat and transform it into another type of energy, for example, electrical, that can be easily used by the existing power consumers.

Thus, there is a need for a new system and method that is capable of determining a location of the ocean bottom where a large amount of geothermal heat is available and can be extracted, and also for an industrial installation or plant that can take advantage of this geothermal heat at a large scale and provide the generated energy to the consumers.

BRIEF SUMMARY OF THE INVENTION

According to an embodiment, there is a geothermal plant for extracting energy from a geothermal reservoir located below the ocean bottom. The geothermal plant includes a floating platform, a riser that extends from a well drilled into the geothermal reservoir, to the floating platform, an electrical pump having a mechanical actuation part located in a bore of the riser, and an electronic part located outside the riser, wherein the electrical pump is configured to pump a geothermal liquid from the geothermal reservoir to the floating platform, and a power plant located on the floating platform and configured to use a steam produced by the geothermal liquid to generate electrical power. The electrical pump is placed at a depth of the riser where the geothermal liquid is in a single-phase.

In one embodiment, there a method for extracting energy from a geothermal reservoir located below the ocean bottom. The method includes a step of placing a first end of a riser into a well drilled into the geothermal reservoir, a step of connecting a second end of the riser to a floating platform, a step of actuating an electrical pump, which has a mechanical actuation part located in a bore of the riser, and an electronic part located outside the riser, to pump a geothermal liquid from the geothermal reservoir to the floating platform, and a step of using steam from the geothermal liquid to generate electrical power with a power plant located on the floating platform. The electrical pump is placed at a depth on the riser where the geothermal liquid is in a single-phase.

According to yet another embodiment, there is a method for estimating a location on the ocean bottom for drilling a well for exploring a geothermal reservoir. The method includes a step of receiving data sets indicative of the geothermal reservoir and ocean conditions above the geothermal reservoir; a step of selecting plural factors represented in the data sets and indicative of the geothermal reservoir; a step of associating each factor of the plural factors with one or more criterion that indicates a desirability of drilling the well at the location of the geothermal reservoir; a step of assigning to each factor of the plural factors an individual score based on the one or more criterion representing the desirability of drilling the well at the location of the geothermal reservoir; a step of aggregating the individual scores into a single overall score; and a step of selecting the location of the geothermal reservoir when the single overall score is larger than a given threshold. The plural factors include seismicity, age of oceanic crust, sediment thickness, bathymetry, wave climate, active ocean floor vents, volcanoes, and seamounts.

BRIEF DESCRIPTION OF THE DRAWINGS

For a more complete understanding of the present invention, reference is now made to the following descriptions taken in conjunction with the accompanying drawings, in which:

FIGS. 14A and 14B illustrate underwater geothermal resource models that estimate the depth in the riser where the geofluid would start to boil;

DETAILED DESCRIPTION OF THE INVENTION

The following description of the embodiments refers to the accompanying drawings. The same reference numbers in different drawings identify the same or similar elements. The following detailed description does not limit the invention. Instead, the scope of the invention is defined by the appended claims.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

According to an embodiment, a novel method for screening the ocean bottom for best drilling locations for tapping into a geothermal resource is presented. According to another embodiment, one or more industrial installations (or geothermal plants) is presented and this geothermal plant (called herein simply the "plant") is designed to extract the geothermal heat and transform it into another energy source that can be delivered for consumption to existing consumers.

Figure 1:
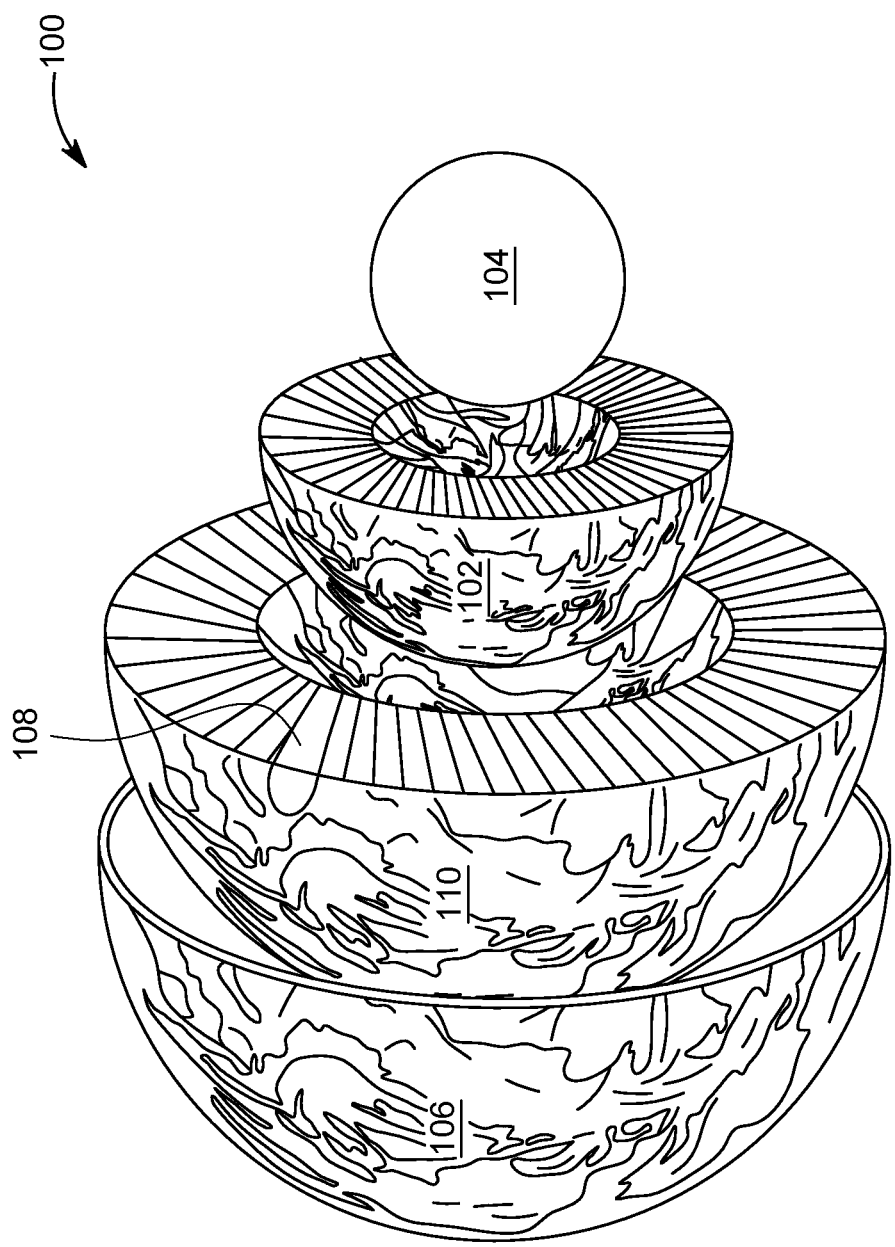
FIG. 1 is a schematic illustration of inner layers of the Earth and the presence of a large amount of geothermal energy stored in some of these layers.
Figure 2:
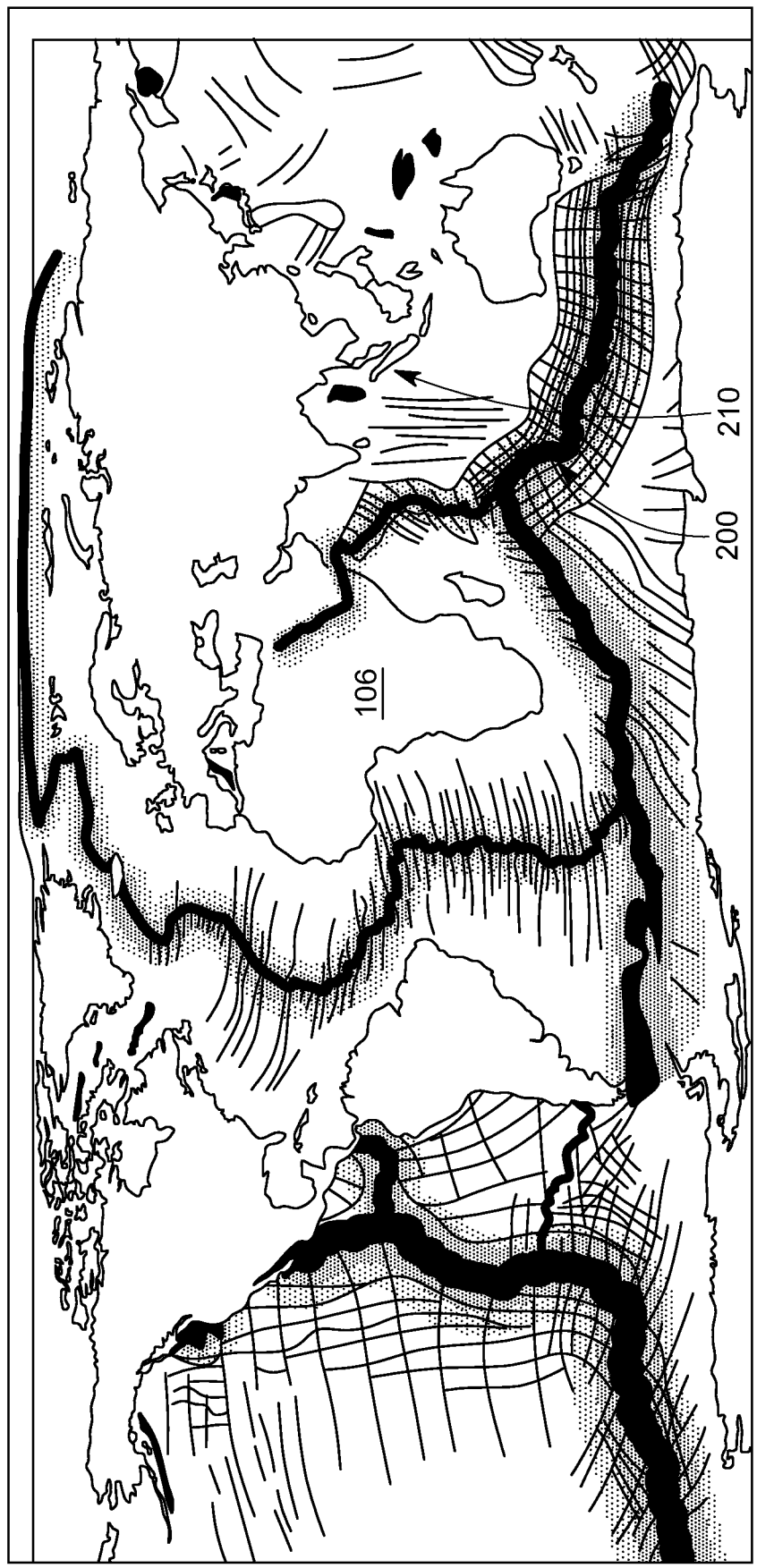
FIG. 2 is a schematic illustration of Earth's oceanic spreading centers through which much of the internal heat escapes.

As illustrated in FIG. 1, the interior regions 102, 104 of the Earth 100 contain a large amount of geothermal energy. Some of this heat escapes to the Earth's surface 106 via volcanoes 108. Terrestrial volcanic areas have historically been the target of most of the commercial exploitation of geothermal energy to date. Some of the heat is lost to the surface 106 by conduction through the Earth's lithosphere 110 and this source is beginning to be exploited onshore as a source of relatively low temperature geothermal energy. However, much of the Earth's internal heat escapes through oceanic spreading centers 200, as shown in FIG. 2, and to a lesser extent via submarine volcanoes 210. An ocean spreading center is understood herein to represent a boundary between two diverging lithospheric plates on the ocean floor. These underwater geothermal energy resources remain currently completely unexploited. It is noted that while the embodiments herein refer to the ocean bottom, the same is true to a sea's bottom or a lake's bottom.

While various research papers noted the potentially large amount of submarine thermal energy in parts of the Gulf of California, these papers did not provide an exploration method and did not explain how to exploit these resources. A method was described for exploiting active vents on the sea floor in that area by installing submarine power plants [1]. The IPCC Report of 2011 on global geothermal energy mentions potential submarine geothermal resources only at oceanic vent sites and comments on the absence of technology suitable for their exploitation. Description of the potential submarine power plant approach for vents in the Gulf of California has become more refined [2].

Another reference [3] has theoretically indicated the potential of using marine geothermal resources, with possible exploitation via submarine power plants or from floating vessels. However, this reference has not described how to assess the magnitude of the resource, how to explore for it, nor proposed specific geothermal development and production methodologies or plants to achieve these goals.

A more concrete proposal has been made by [4], which utilizes drilled wells, rather than natural vents. This proposal assumes that geofluids at supercritical temperatures and pressures can be accessed, and that these would drive supercritical turbines installed on the sea floor. However, providing supercritical turbines on the ocean bottom, at depths that might reach 3 km, is not an easy endeavor and their maintenance would be challenging. Also, using a given volume of supercritical fluid can in theory deliver more power than a cooler fluid, but the potential problems of rock permeability in supercritical conditions, and problems of corrosion or scale as the supercritical fluid changes to vapor plus liquid, with decreasing pressure and temperature, are significant—particularly for technologies installed on the deep sea bed. Therefore, this technology does not appear to be the desired norm for ocean bottom exploration for large scale.

As the oil and gas companies have particular expertise in geoscience and in subsurface imaging, for example CGG, the assignee of this application, the inventors are combining the available data regarding the geothermal resources with the seismic data already generated with regard to the oil and gas surveys, to establish a method for determining the best location of a potential well that can tap into the existing geothermal resources. In this respect, the inventors believe that to target high temperatures spots combined with high permeabilities of the crust surrounding these high temperature spots will ensure the economic success of exploiting geothermal resources in the underwater setting. In this regard, this disclosure shows novel methods for underwater geothermal exploration screening, development and production.

In one embodiment, in contrast to onshore geothermal wells, the flow rates of offshore high temperature geothermal wells can be increased by pumping. A novel reservoir injection, which uses valve-controlled gravity feed, is also described. In still another embodiment, it is disclosed how offshore geothermal wells that underperform at exploration, development or production stage could be used for safe storage and mineralization of carbon dioxide. One or more embodiments discussed here can be combined to improve the developing of these potentially large offshore geothermal resources at scale, and at a rate that will help the world-wide objective of reaching net zero carbon dioxide by 2050.

The embodiments discussed herein identify a number of ways in which the value of the offshore green geothermal resource can be delivered in different market settings: (1) electrical power cable to shore, (2) generation of hydrogen via hydrolysis, (3) conversion of hydrogen to ammonia, (4) battery storage. Other technologies may also be used based on the discussed embodiments. In one application, the inventors show how by-products of offshore geothermal power generation may have commercial potential in appropriate market settings, including but not limited to:

fresh water, being either the entire condensable steam volume if all power is exported to shore or stored in batteries, or the surplus fresh water remaining if some is used to generate green hydrogen;

geofluid brine nutrients, released into the photic zone to increase marine primary production, whilst enhancing the open water fishery or helping sustain aquaculture, also have the benefit of new draw-down of atmospheric carbon dioxide using simple low-cost technology;

release of the oxygen by-product of electrolysis alongside brine nutrients, would help prevent eutrophication and thus enhance the wild fishery or to develop caged aquaculture; and metal or chemical concentrations in the geothermal brines might in some areas be high enough to warrant extraction.

The offshore geothermal electrical power resource volume is so large that, in favored geographic settings, the power might be used for low carbon manufacture of cement or for steel manufacture. The combination of multiple routes to commercialization, plus their magnitude and potential "running room," makes offshore geothermal resources well-placed to become a valuable contributor to future low-carbon global development.

A method for offshore geothermal exploration screening is now discussed. This method involves mapping and integrating the following components:

oceanic crust age,
spreading centers,
transform faults,
volcanoes,
seamounts,
seismicity,
ocean floor vents
sediment thickness,
sediment type,
bathymetry, and
wave climate.

Each of these components is assigned an individual score and then the individual scores are aggregated to generate an overall score. The selection of the location of the well is based on the overall score. Each of these components is now discussed followed by the discussion of a method in which the individual scores of these components are combined to generate the overall score for geothermal exploration screening.

Figure 3:
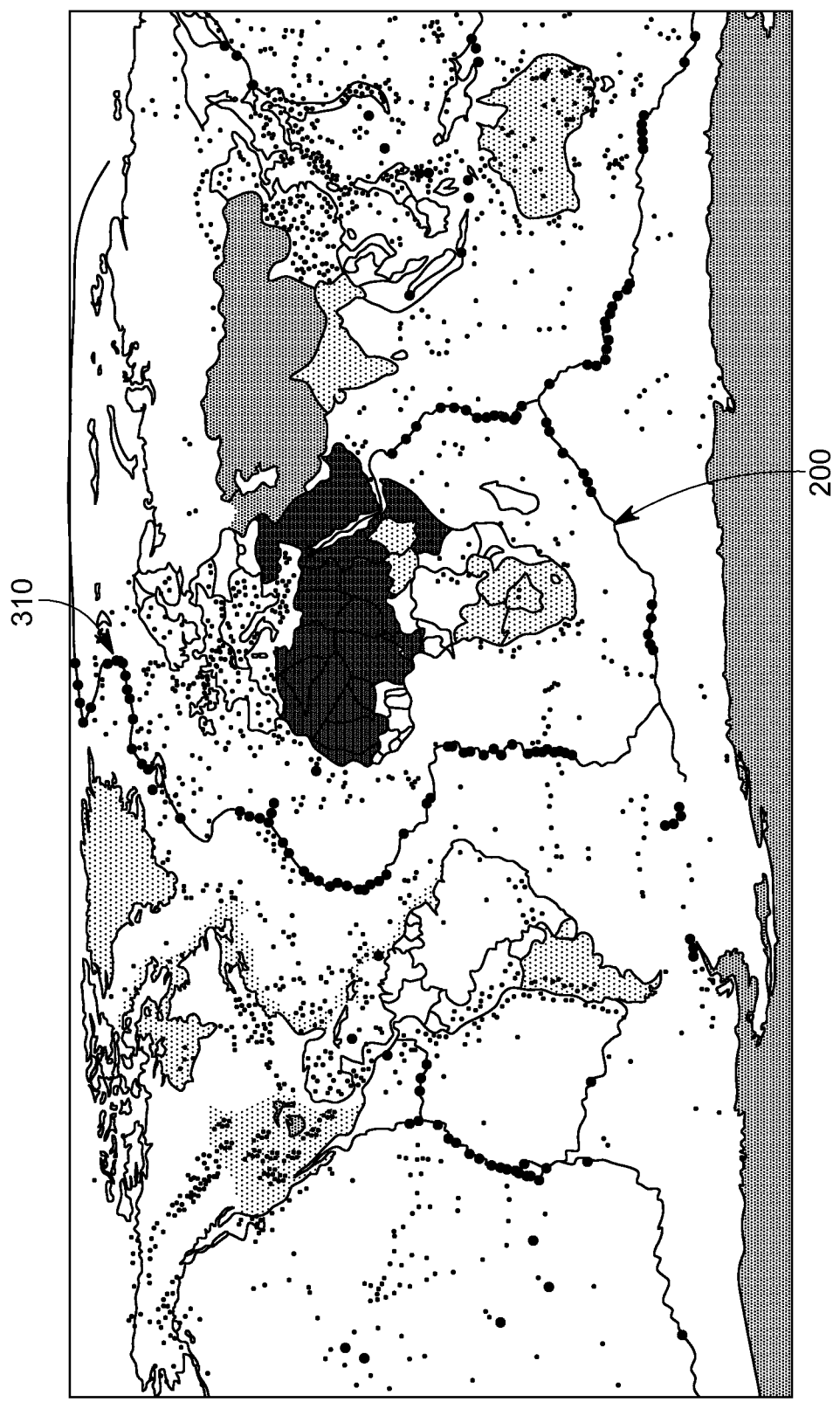
FIG. 3 illustrates the oceanic spreading centers and the locations of the sea floor vents.

The oceanic crust age, spreading centers and the transform faults are the main factors that contribute to the screening of the best position for drilling a well. Thus, these factors may be weighted in the overall score more heavily than the other factors. The maps of the ocean crust age shown in FIG. 2, which were generated based on data collected with regard to oil and gas exploration, were improved by new mapping of the oceanic spreading centers 200 shown in FIG. 3 and the transform faults 310. In this application, the term "transform fault" is used to refer to the zone of active faulting which links two oceanic spreading centers. The new mapping was based on integrated ArcGIS maps of recent baythmetric data and seismicity. ArcGIS is a geographic information system for working with maps and geographic information maintained by the Environmental Systems Research Institute. The mapping allowed the age difference between the spreading centers and the old ocean floors, juxtaposed across transform faults, to be quantified prior to input into the map-based thermal modelling method.

Figure 4:
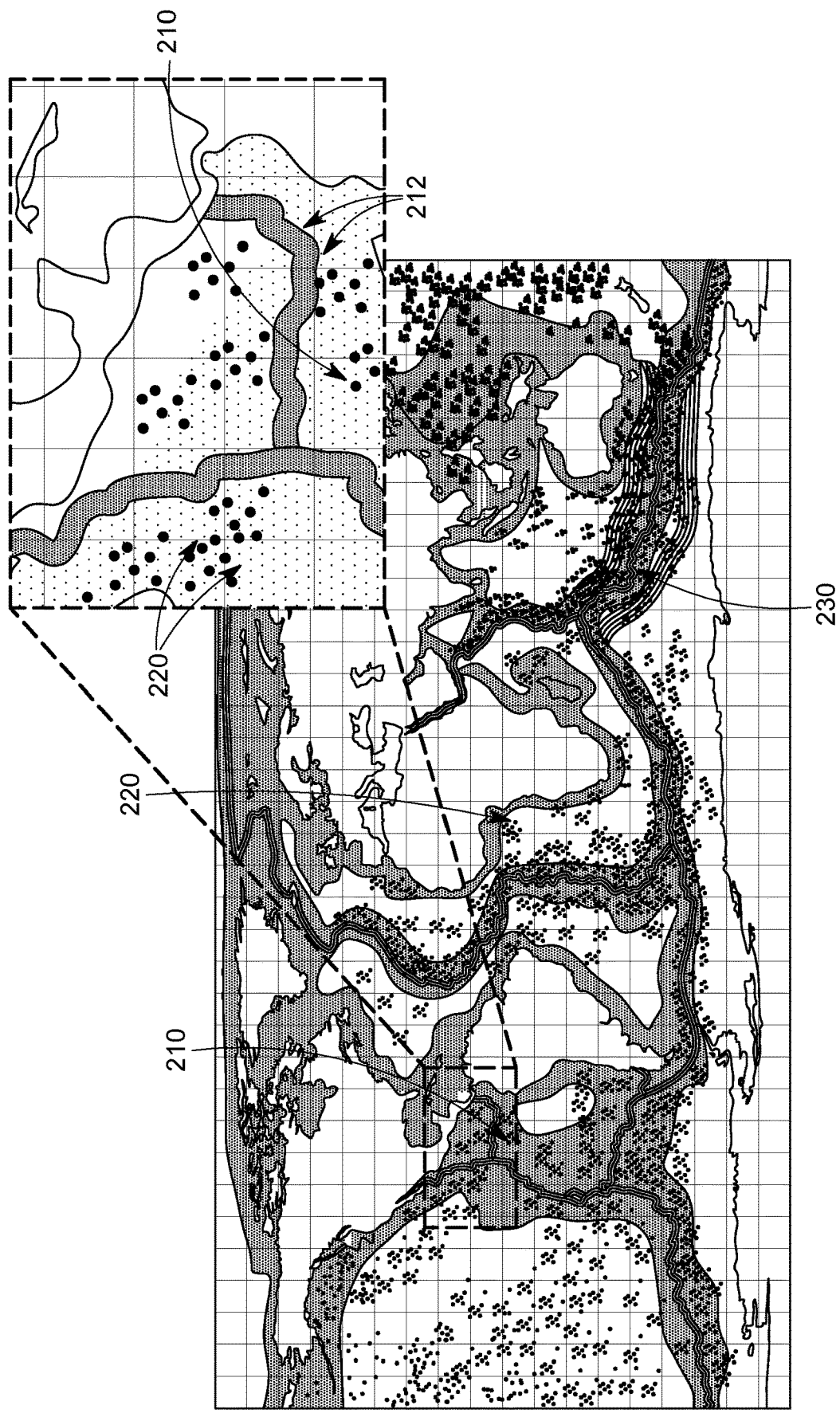
FIG. 4 is a map that illustrates the location of the terrestrial volcanoes and underwater seamounts.

The ocean volcanoes 210 and terrestrial volcanoes 212 are illustrated in FIG. 4 together with seamounts 220. The youngest part 230 of the ocean floor was also represented in this map. The submerged flanks of some offshore volcanoes 210 may offer secondary targets for geothermal exploration, so distributions of active and potentially dormant volcanoes were compiled from a variety of sources (for example, National Oceanic and Atmospheric Agency, and the Smithsonian Institute) and integrated into ArcGIS. Other software platforms may be used for integrating this information. It is noted that the method for screening locations where to drill the well is software and machine agnostic, as any software and appropriate hardware can be used to implement the method.

Some seamounts may represent unrecognized active or dormant volcanoes, and so could offer third level targets for geothermal exploration. The distributions of the seamounts 220 shown in FIG. 4 were compiled from bathymetric grids, for example, as provided by General Bathymetric Chart of the Oceans (GEBCO, see www.gebco.net) and from the distribution of satellite-derived gravity anomalies (Kim and Wessel, 2011, New global seamount census from altimetry-derived gravity data, Geographical Journal International 186, 615-631).

Figure 5:
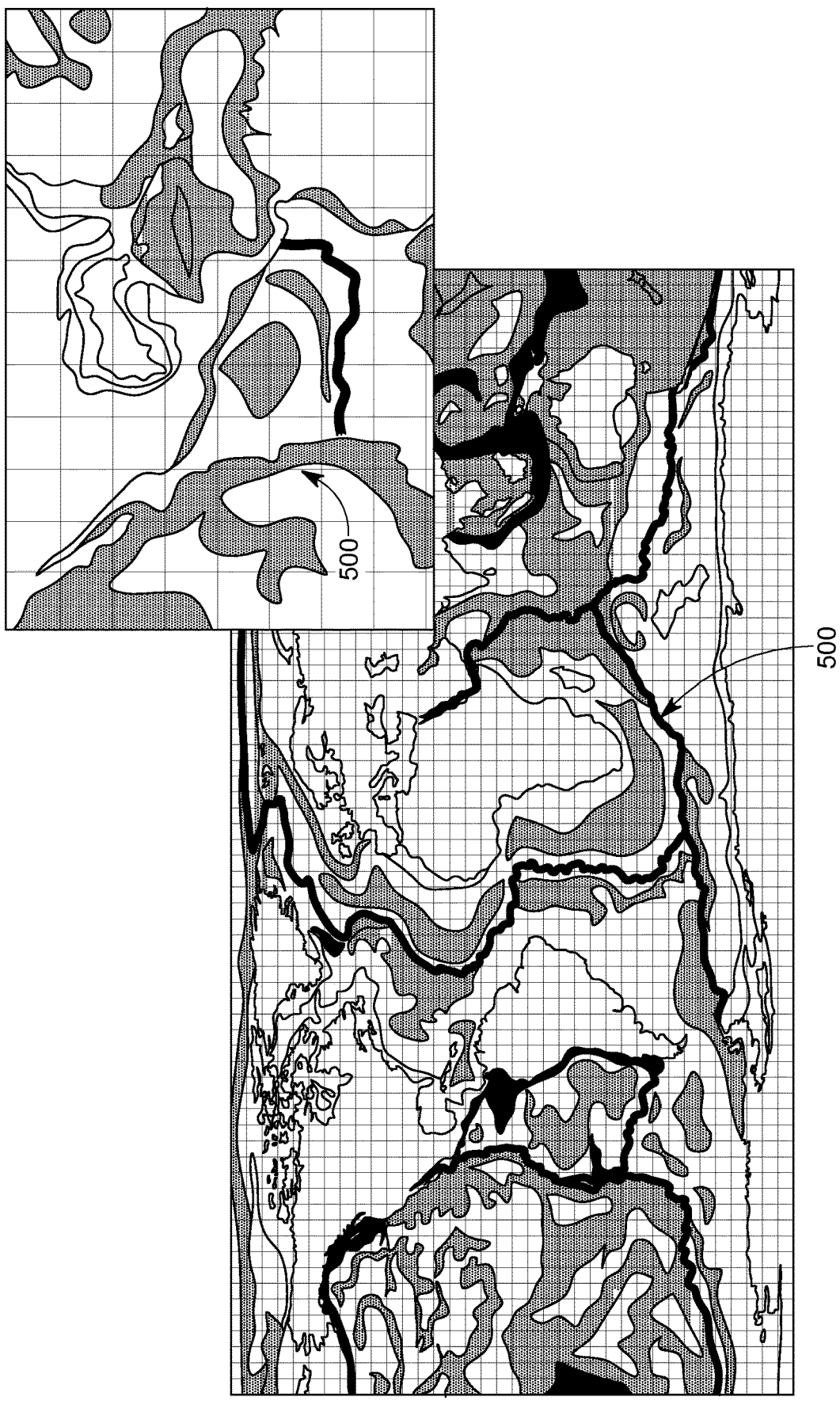
FIG. 5 is a map that illustrates the underwater earthquake epicenters with magnitudes greater than 4 on a contour map of bathymetry.

The seismicity is another factor that influences the location of the well. Heat transfer by convection and advection within the crust can play a key role in elevating the temperatures of strata under relatively shallow depths in the crust and its sedimentary cover. The distribution of seismicity gives an indication of where rocks are fracturing, and hence potentially offering permeability pathways for rising hot geothermal fluids. The distributions of seismicity epicenters 500 is illustrated in FIG. 5 and was compiled from publicly available sources.

Figure 6:
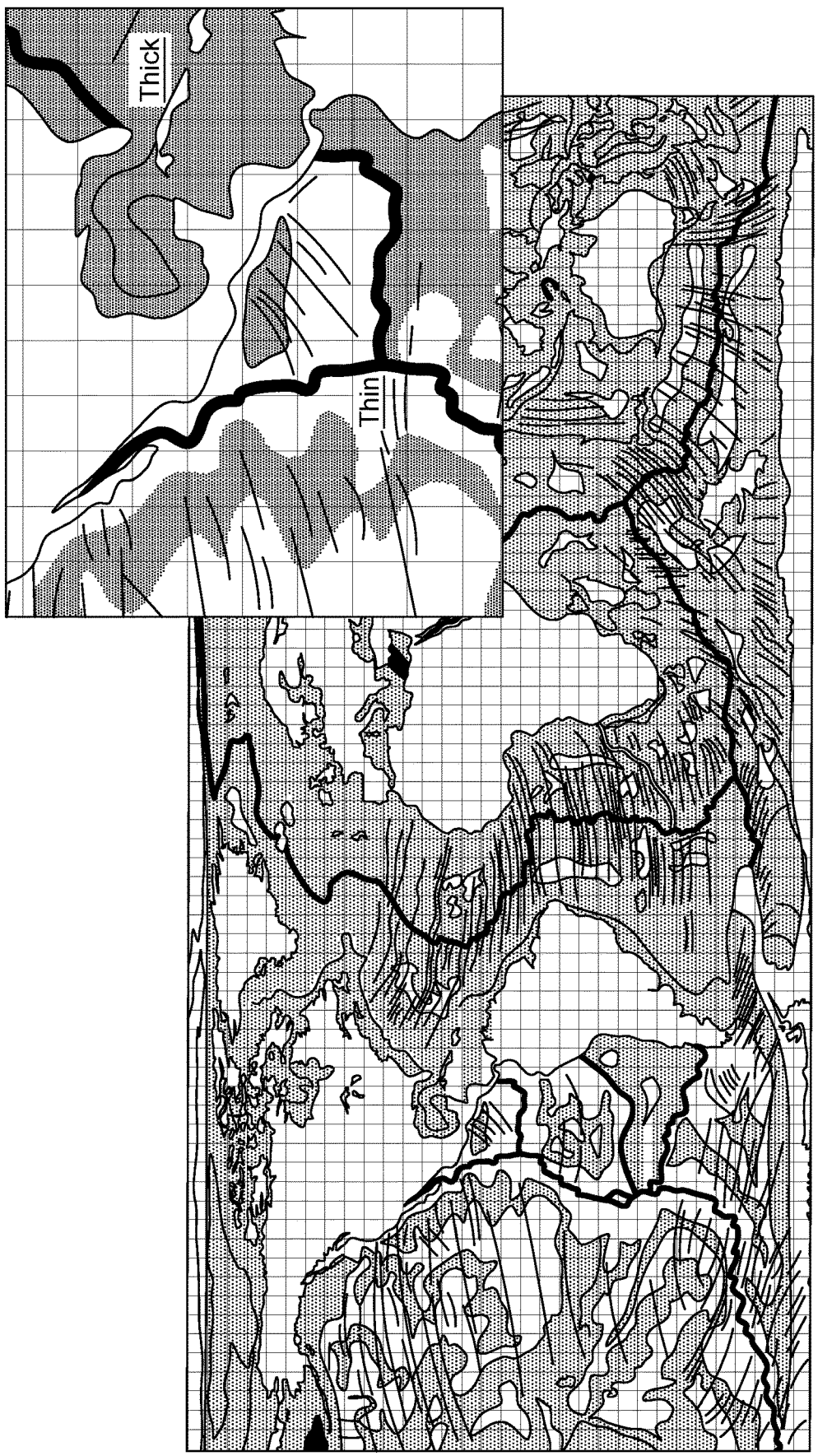
FIG. 6 is a map that illustrates a sediment thickness on the ocean bottom and fracture zones and bathymetry.

The sediment thickness and sediment type are factors that can help seal the subsurface geothermal system from cold ocean bottom waters, and so prevent excessive chilling of the geothermal reservoirs by convection and advection. The type of sediment can have a bearing on its sealing capacity. The thickness and character of the sediment can also affect its ability to insulate the geothermal reservoir from heat loss by thermal conduction. In some circumstances, the presence of a few hundred meters of sediment can assist with the initial drilling and setting of the casing. Thus, a good sediment with a reasonable thickness, for example, smaller than 3,000 m, has a high score contribution when the overall score for the selection of the well is calculated. However, a sediment thicknesses in excess of 3,000 m may make the geothermal development in the oceanic crust impractical, but in this situation sedimentary geothermal reservoirs may be present in the sedimentary column. The distribution of the sediment thicknesses is illustrated in FIG. 6 and was compiled mainly from in-house sources.

Figure 7:
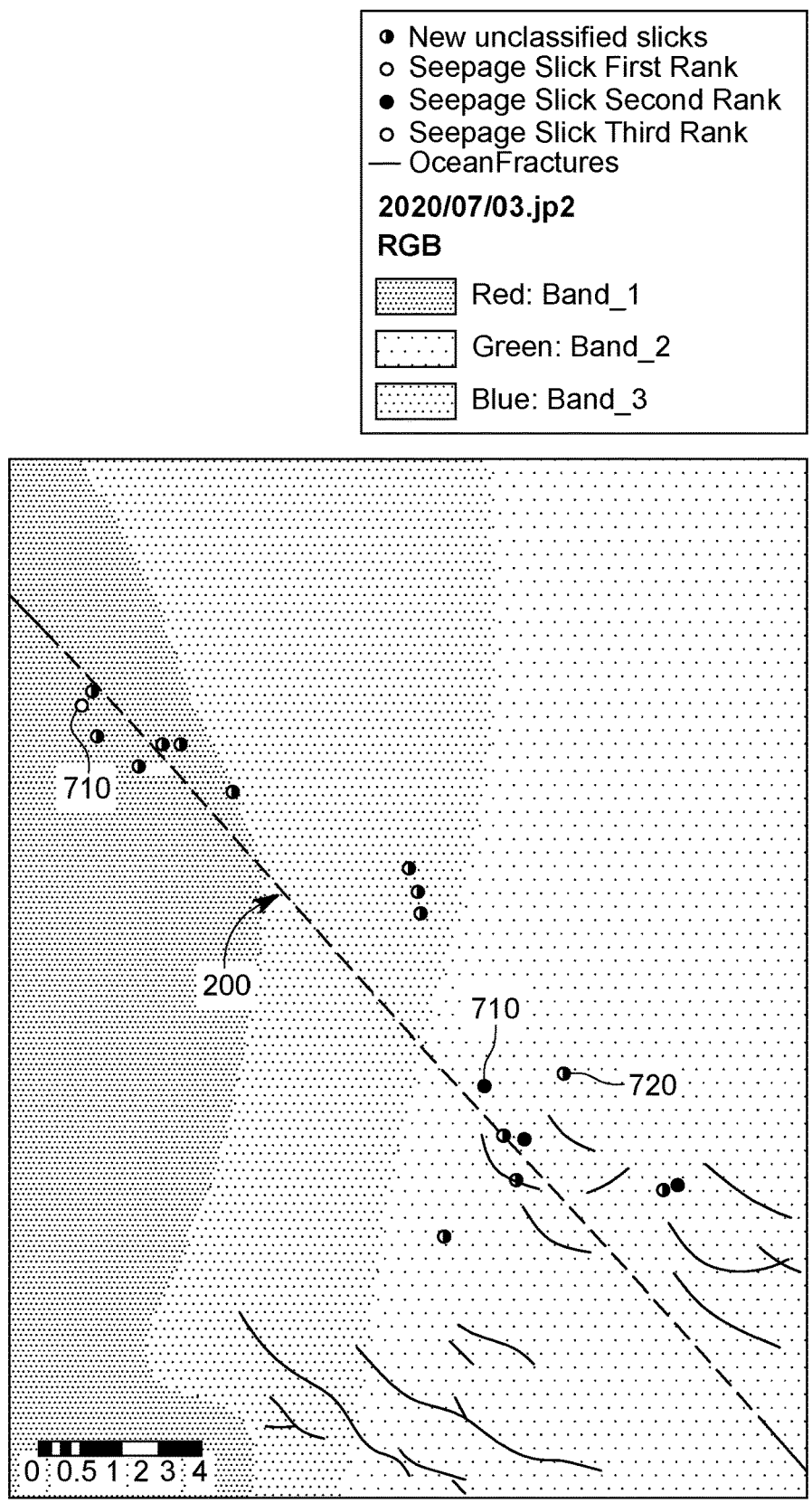
FIG. 7 is a map showing synthetic aperture radar images of the ocean surface for exploring geothermal sites.

The ocean floor vents, both continuous and episodic, mostly show where hot geothermal fluids are rising through the ocean crust and sediments to discharge onto the sea bed. The known and unknown near-continuously erupting vents need to be mapped so they can be avoided because: they are potentially valuable sites for biological and chemical research, and they are likely to be cooling the geothermal system. Some vents have been visited and sampled, so their locations, fluid temperatures, chemistries and flow rates are known. The presence of others is inferred from the chemical "fingerprint" of vent fluids in the ocean water column. Less commonly, the flux to surface of nutrient-rich geothermal fluids has triggered algal blooms in surface waters that are large enough to be seen on satellite imagery. The novel mapping illustrated in FIG. 7 shows the use of synthetic aperture radar in key areas, to detect slicks that may represent biogenic or inorganic chemical sea surface expressions of leakage of geothermal waters. Based on this identification, corresponding ocean floor vents are determined. FIG. 7 shows the axis of the ocean spreading centers 200, seepage slicks 710 of various ranks, and new unclassified slicks 720. Note that these slicks may in some cases represent episodic leakage of geothermal waters and thus, they provide an additional tool for exploring for underwater geothermal sites. This method indicates that such slicks are relatively common in the vicinity of some spreading centers 200. This is important since it suggests that open marine ecosystems are more likely to be adapted to fluxes of the nutrients in geofluids, as proposed here, than to contentious methods of ocean fertilization that have been attempted previously such as iron input [5].

Each of the bathymetry and wave climate factors, depending on their values, can have a high or low individual score. For example, it is desired that the water depth for a possible well location is less than 400 m, which means a high individual score. However a water depth larger than 4,000 m is undesired because of the difficulties of placing a riser at such a depth. Thus, such a water depth would have a low individual score. In terms of the wave climate factors, it is desired that the water surface is smooth and not affected by large waves, as the floating platform that sits at the selected site and all afferent components of the plant would be negatively affected by these waves.

Figure 8:
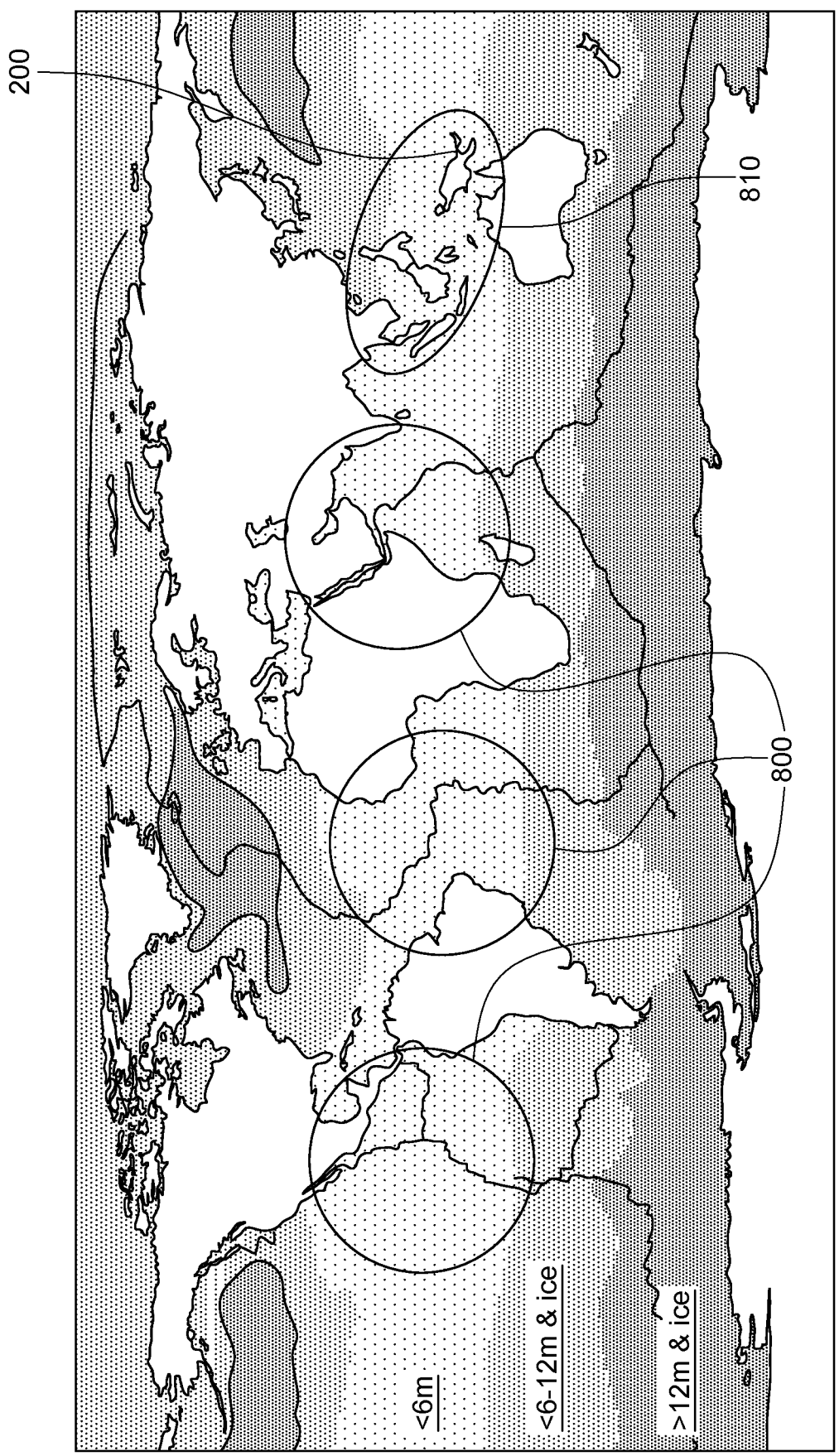
FIG. 8 illustrates the main spreading centers in low wave areas.

Bathymetric maps as shown in FIG. 5 were compiled since the thermodynamic behavior of geothermal fluids and of carbon dioxide is partly controlled by hydrostatic pressure. In addition, water depth and the wave climate carry important implications for engineering, and therefore costs. So global maps of wave climate as illustrated in FIG. 8, which are derived from public domain information [6], and bathymetry were combined to help high grade offshore areas for geothermal potential. FIG. 8 shows sections 800 of the main spreading centers in low wave areas and areas 810 of localized oceanic spreading centers 200.

Figure 9:
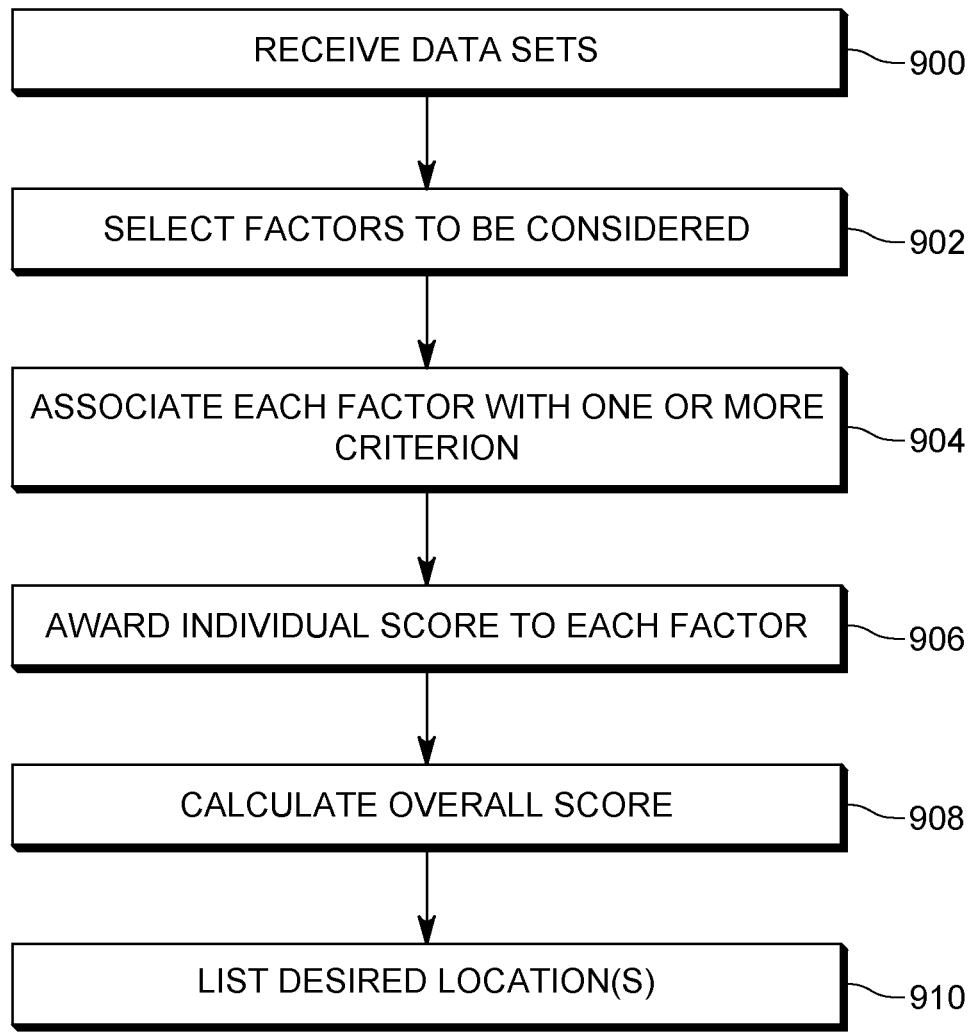
FIG. 9 is a flow chart of a method for selecting an advantageous location on the ocean bottom for drilling a well to reach a geothermal reservoir.

Based on some or all of these factors, an offshore geothermal exploration screening method is now discussed with regard to FIG. 9. In step 900, the method, which is implemented into a computing system, receives one or more data sets, e.g., the maps discussed above with regard to the figures. The data sets may be the maps shown in FIGS. 1 to 8. In one application, all these maps are received as input. However, one skilled in the art would understand that less or more maps may be received, i.e., less factors may be considered, or additional factors may be considered, water temperature, rock permeability, etc. Each data set or map illustrates at least one factor, where the factor may be any one of the oceanic crust age, spreading centers, transform faults, volcanoes, seamounts, seismicity, ocean floor vents, sediment thickness, sediment type, bathymetry, or wave climate. Other factors may be considered, as for example, the water temperature at the ocean bottom, the ambient temperature (for example, it might be undesirable to have the plant in a very cold region), rock permeability, proximity to inhabited areas, the proximity to highly inhabited areas, the proximity to land, the type of coastal soil (for example, if the coast region is swampy, it is undesired to place cables and/or pipes into such an environment), etc.

In step 902, one or more of these factors is selected for being assigned an individual score. This process may be performed by the operator of the computing system, or by an automated software procedure, for example, neural network system. In other words, from the plurality of the received data sets, which are associated with corresponding factors, one or more factors are selected for further processing. As an example, the operator or the automatic software procedure may select only N factors of the M available factors, where N and M are natural numbers and N<M. In one embodiment N=M.

In step 904, each factor is associated with a set of criteria, i.e., a set of rules. For example, if the factor is the seismicity, only earthquakes of magnitude 2 and greater, per 10,000 $km^2$, over the 38 year-period to 2016, are considered. These earthquakes, which are shown in a corresponding map, may be associated with intervals or bins: for example, more than 200, between 200 and 100, between 100 and 10, between 10 and 1, and less than 1. These intervals or bins are exemplary and not intended to limit the invention. One skilled in the art could change the sizes of the intervals or bins as appropriate, based on hindsight from this application.

In step 906, the selected factors from step 902 are awarded individual scores, based on the data sets received in step 900, and also based on the criteria received in step 904. The individual scores of the selected factors for the screening process are then (polygonised) contoured, defining polygon areas of equal score, according to the criteria defined below. The polygon scores are summed, for example, in ArcGIS, to generate the overall exploration screening score. In one embodiment, the factors are scored (possible score values are in bold) as follows:

The seismicity has the score 5: if more than 200 M2 earthquakes per 10,000 $km^2$, over the 38 year-period to 2016, 4: for 200 to 100 M2 earthquakes, 3: for 100 to 10 M2 earthquakes, 2: for 10 to 1 M2 earthquakes, and 1: for less than one M2 earthquake;

The age of the oceanic crust (in million years) is scored as 5: 0 to 6, 4: 6 to 10, 3: 10 to 15, 2: 15 to 20, and 1: >20;

The sediment thickness (m) is scored as 5: 300 to 1,000, 4: 50 to 300, 1,000 to 1,500, 3: 1,500 to 2,000, 2: 2,000 to 3000, and 1: >3000

The bathymetry is scored (depth of ocean) as 5: 0 to 400, 4: 400 to 1,000, 3: 1,000 to 2,000, 2: 2,000 to 3,000, 1: 3,000 to 4,000, and 0: >4,000;

The wave climate (m, maximum significant wave height in 12-year period) is scored as 5: 0 to 6, 3: 6 to 12, and 1: >12;

The continuously active ocean floor vents (10 km buffer around the drilling site) is −28. This large and negative score is selected to ensure that such sites are not targeted as these zones are not stable, and they can be dangerous for the geothermal plant.

The volcanoes, active and dormant, (10 km buffer around the drilling site) are scored as 2;

The seamounts (10 km buffer around the drilling site) are scored as 1.

It is noted that some of the factors are desirable, and thus, they might be scored high, while the presence of other factors is undesirable, and thus, they are scored very low, or even with a negative individual score.

The overall score is calculated in step 908. Various methods may be used for calculating the overall score. One is the software platform ArcGIS. Another one is using a function "f" that takes as input all the individual scores and outputs a single overall score. The function f may be a polynomial function, where each individual score is weighted with a given coefficient. In one application, the function f is simply the sum of all the individual scores. Other functions or software platforms may be used to combine the individual scores.

The following map components are used to help guide interpretation of the polygon mapping in areas where data for seismicity and sediment thickness are considered insufficient: spreading centers, transform faults, and sediment type. This means, that even for the areas where not all the factors are available, the method can still calculate an overall score based on less factors. In other words, the function may have a variable number of factors, depending on the available data. However, in one embodiment, the function needs at least the spreading centers, transform faults, and sediment type data for calculating the overall score.

Figure 10:
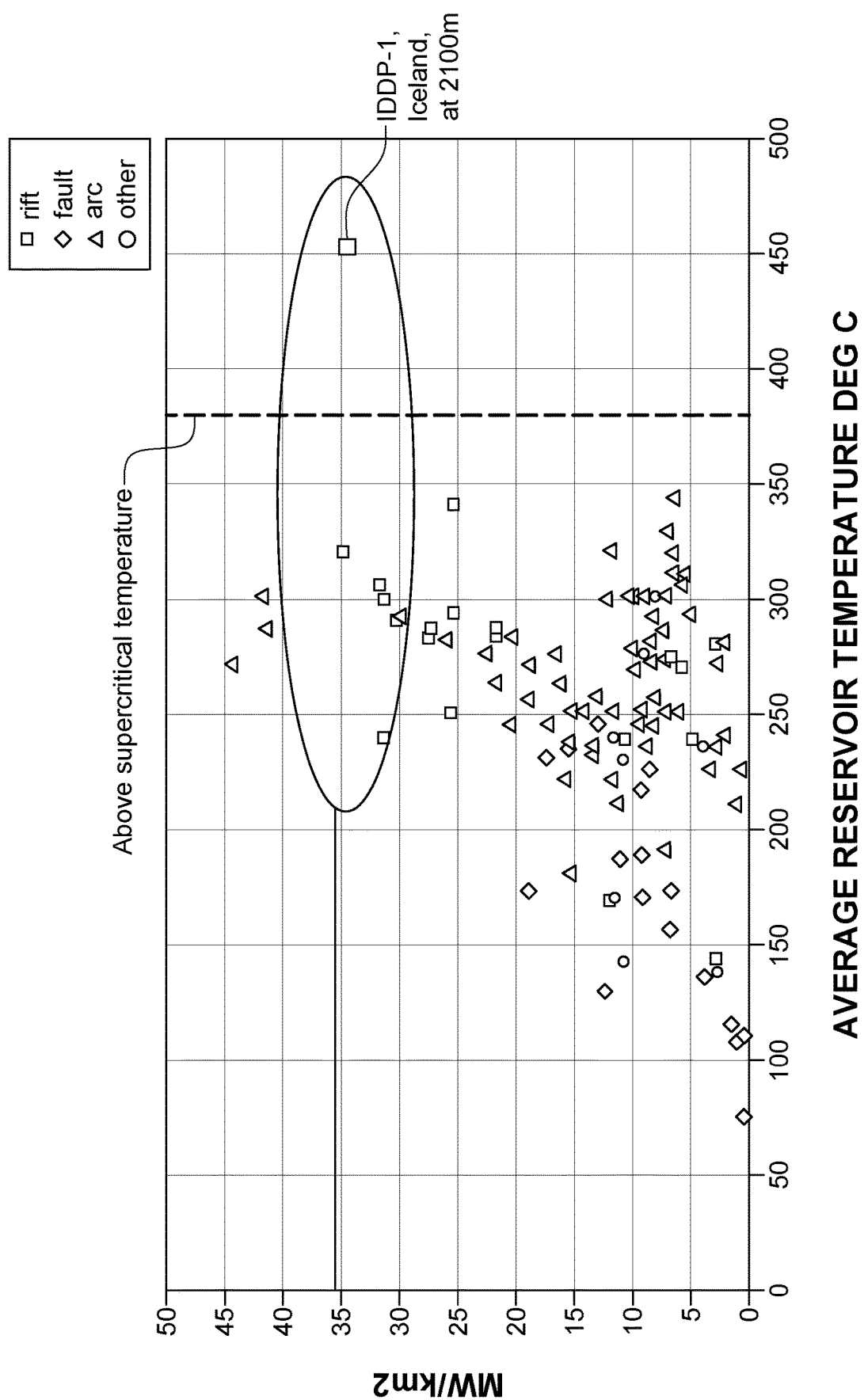
FIG. 10 illustrates resource densities for onshore geothermal fields.

In step 910, the overall score is compared with a given threshold, and if the overall score is larger than the given threshold, the physical ocean location corresponding to the overall score is listed as a desired location for drilling the well and extracting the geothermal energy. The results from the integration of the map elements using the methodology described in FIG. 9 can be used to predict potential geothermal resources that are ideal for exploration. For example, the spreading center resource potential can be estimated using the resource density from an Iceland rift analogue of 35 MWe/km, which is illustrated in FIG. 10. The rift settings in Iceland are the closest onshore analogues to oceanic spreading centers on young oceanic crust. This analogue has been applied for the ocean crust areas less than 6 million years old, in water depths of less than 1,000 m, in areas where the maximum significant wave height for a 20 year period is less than 6 m.

The potential resource result is 5,900 GWe, which is slightly more than the world's total annual electricity generation. If the water depth constraint is relaxed to 3,000 m, which is within the depth window of current hydrocarbon exploration and production, then the total potential resource rises to 67,000 GWe. Application of onshore analogues may underestimate the potential resource available in offshore settings. The production-related discussion presented next shows that there is potential upside to offshore geothermal from pumping high temperature fluids, which is not available in onshore settings. In addition, relatively large wellbores are available in deep water setting, which permit higher flow rates and therefore additionally has the potential to improve the energy flux rates per well.

Having selected the best location for exploring the geothermal resources, the next steps are related to geothermal production. The following embodiments address this operational aspect of the geothermal production and introduce novel ways for extracting this energy from the crust. These embodiments are directed to at least four configurations: (1) an auxiliary riser diverting from the main riser below the onset depth for two-phase flow, to permit remediation of scale or corrosion without reduction in flow, (2) a valve method and system to use ocean water and ocean water pressure to sustain reservoir pressure without pumping, (3) a valve method and system to use geothermal brine and ocean water pressure to sustain reservoir pressure without pumping, and to suppress organic growth that might decrease injection permeability, and (4) an injector pattern method and system designed to evolve during production to maintain reservoir pressure and to improve thermal sweep between the gravity-driven injectors and the producer.

Figure 11A:
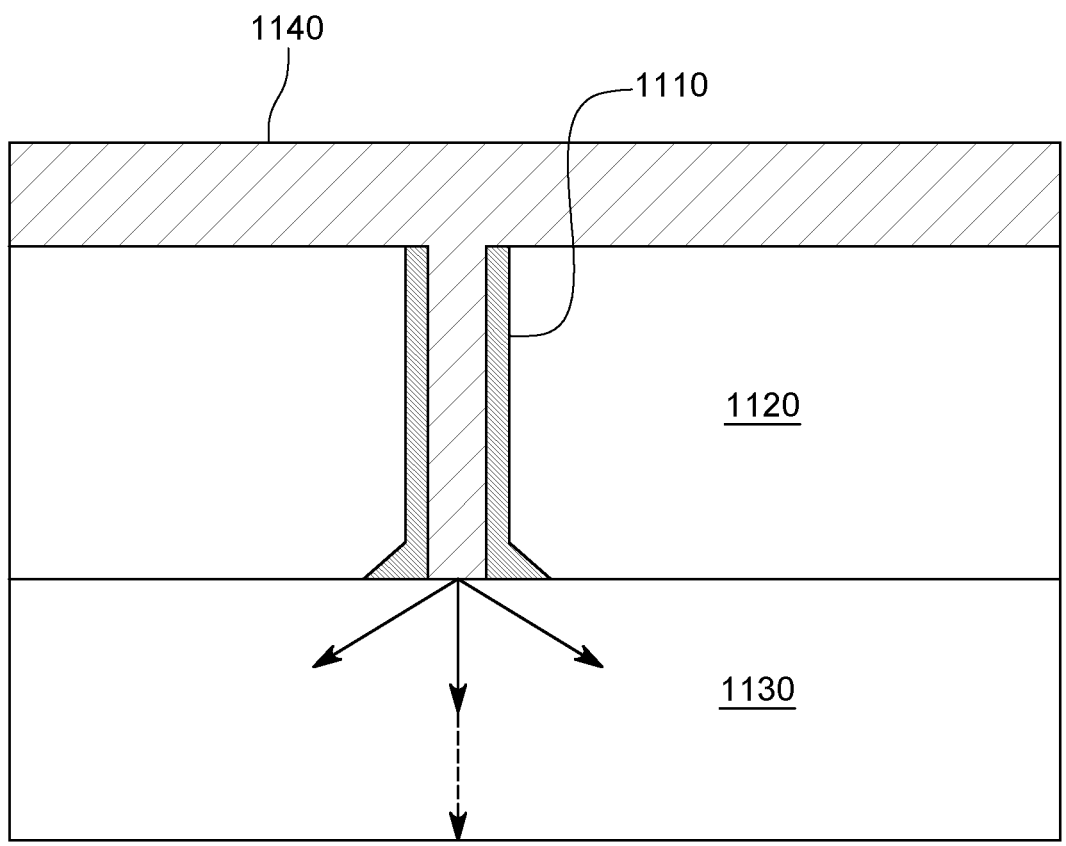
FIG. 11A schematically illustrates the structure of a vent wellbore on the ocean bottom and FIG. 11B shows data indicating the high natural permeability in pillow basalt sites.
Figure 11B:
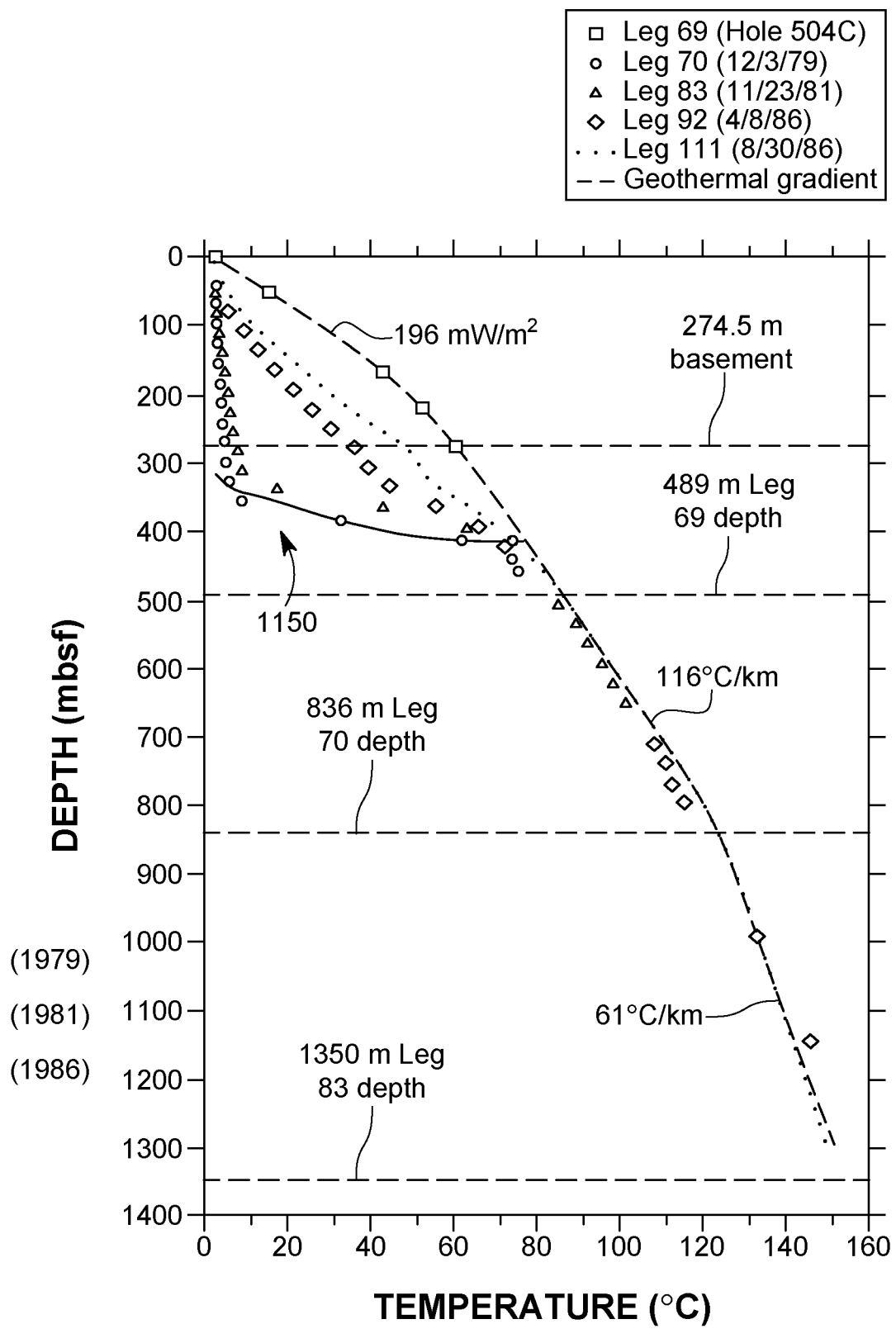

The seabed vents demonstrate that the oceanic crust near the spreading centers is permeable, and numerous vent fields contain at least one system emitting fluids in the temperature range of 250° C. to 400° C. Research wells drilled away from the ridge crest, in basalts about 6 Ma old, demonstrate that the permeability persists in the upper part of the oceanic crust, giving flow rates calculated at 6,000-7,000 liters/hr. These flow rates into permeability systems in pillow lavas are driven by the density difference between the cold ocean waters, at about 3° C., and the pillow lava pore waters, at about 70° C. In this regard, FIG. 11A schematically illustrates a vent wellbore 1110 that extends through sedimentary material 1120, which acts as a seal (for example, biogenic ooze), and connects the hot water from the geothermal reservoir 1130 to the cold ocean bottom water 1140. FIG. 11B shows the experimental measurements collected for the crust temperature as a function of the depth from the ocean bottom, and also the location 1150 of the estimated rate of inflow, i.e., 400 m depth.

Still with regard to FIG. 11B, relatively slow P wave velocities have been interpreted as indicating that the upper 1 to 2 km of the young oceanic crust is porous, whereas the upper ocean crust more than a few tens of years old shows normal P wave velocities, suggesting the porosity systems become cemented with time. In line with this interpretation of the P wave velocities, the chemistry of core samples from altered mafic igneous rocks indicates that oceanic waters have penetrated to depths of at least 1.5 km in late Cenozoic oceanic crust.

Numerous measurements of the thermomechanical properties of recovered core samples during the drilling of oil and gas wells are available. The measured permeabilities and porosities in these samples are typically very low. However, core recovery from the upper part of the oceanic crust is generally less than 50%, which leaves open the question of what permeability is represented by the unrecovered cored intervals. The inventors' experience from the oil and gas exploration suggests that the unrecovered sections often represent the most permeable and porous sections of a cored rock sequence. Fluid injection tests, though very limited in number, do indicate that permeability in the upper oceanic crust is significantly higher than would be inferred from the permeability measured on cores recovered from oceanic crust [7].

The number of wells with in-situ measurements of temperature and permeability in young oceanic crust is extremely limited. Consequently, there is a need to develop a method for predicting locations where the combination of high permeabilities and high temperatures at drillable depths is favorable for geothermal exploration and development. The use of software ordinarily applied to modelling temperatures for oil and gas exploration in sedimentary basins was extended into the oceanic crustal setting by collating and integrating published data on:

Thermal conductivity for a range of igneous and other crystalline rock types expected in oceanic crust and lithosphere;

Changes in these thermal conductivities with variations temperature and pressure; and Heat generation for a range of igneous and other crystalline rock types expected in oceanic crust and lithosphere during emplacement, during crystallization and post-solidification.

The new lithology types, assigned with appropriate thermo-mechanical values including thermal conductivities and heat generation, were then created for populating the Zetaware (see zetaware.com) thermal modelling software products Genesis and Trinity. Note that although specific examples of modelling software products are used herein, the scope of these examples is to enable one skilled in the art to make this invention, and not to limit the embodiments to any of these software products. In fact, other industry software products, such Petromod (see software.slb.com), are available and could be used to perform the work described herein.

The permeability of the intended zones to be drilled can also be used for determining whether to drill or not the well for reaching the geothermal resources. The use of software ordinarily applied to modelling permeabilities for oil and gas exploration in sedimentary basins was extended to include permeability in the oceanic crustal setting by collating and integrating published data on:

Permeability for a range of igneous and other crystalline rock types expected in oceanic crust and lithosphere;

Changes in these permeabilities with variations in temperature and pressure;

Permeability for a range of fault and fracture types in a range of igneous and other crystalline rock types expected in oceanic crust and lithosphere; and Changes in these fault and fracture permeabilities with variations in temperature, pressure and fluid chemistry.

Causes of these permeability changes can include, but are not limited to: (1) increases due to opening of permeability pathways by extension; (2) increases due to corrosion of rock along permeability pathways, (3) reductions due to closure of permeability pathways by compression, and (4) reductions due to mineral precipitation along permeability pathways.

The geological processes driving these changes can include, but are not limited to: (1) permeability increase due to extension across faults and fractures by shrinkage of rock due to cooling of the crust with increasing distance from the oceanic spreading center, (2) permeability increase due to extensions across faults and fractures due to changes in the tectonic intra-plate stress regimes, (3) permeability decrease due to compression across faults and fractures due to increased loading by addition of overburden thickness, (4) compression across faults and fractures due to changes in the tectonic intra-plate stress regimes, (5) permeability increase, by dissolution of wall-rock minerals along permeability pathways by in-situ geofluids, or permeability decrease by mineral precipitation along permeability pathways from in-situ geofluids, may be triggered by cooling of crust and overlying sediments with increasing distance from the spreading center, (6) permeability increase, by dissolution of wall-rock minerals along permeability pathways by in-situ geofluids, or permeability decrease by mineral precipitation along permeability pathways from in-situ geofluids, may be triggered by heating of crust and overlying sediments due to increased burial by addition of overburden, (7) permeability increase by dissolution, or permeability decrease by mineral precipitation, may also be caused by advective inflow of different fluids with different temperatures or chemistries; changes in the tectonic stress regime, in the burial stress/temperature regime, or renewed magmatic intrusion and heating, are all potential changes of advective inflow in this context, and (8) permeability increase by dissolution, or permeability decrease by mineral precipitation, may also be caused by convective circulation of different fluids with different temperatures or chemistries. Changes in the tectonic stress regime, in the burial stress/temperature regime, or renewed magmatic intrusion and heating, could potentially trigger convective circulation in this context. Determining the interplay between these permeability drivers forms the basis of a series of geological models for permeability distribution.

The thermo-mechanical responses of rocks, fluid flow rates and rates of heat transfer in different geological scenarios are modelled, for example, in CGG GeoSIM software (CGG, Paris). As previously noted, other software platforms, such as TOUGH 3 (tough.lbl.gov/software/tough3/) and Eclipse (www.software.slb.com/products/eclipse/field-mgmt), may be able to undertake similar modelling. Note that all the above factors that influence the temperature gradients and the crust permeability may be used as factors with regard to the method illustrated in FIG. 9, and the temperature gradients and the permeability of a possible drilling location may be scored to contribute to the overall score of that location. In one application, all the factors discussed above that influence the temperature gradients and the permeability of the crust may also be used with the method of FIG. 9 for determining the overall score. In this or another application, the temperature gradients and the permeability of the crust are heavily weighted to influence the overall score as it is desired to have a high temperature gradient and a low permeability of the crust or sediment above the geothermal reservoir.

Figure 12:
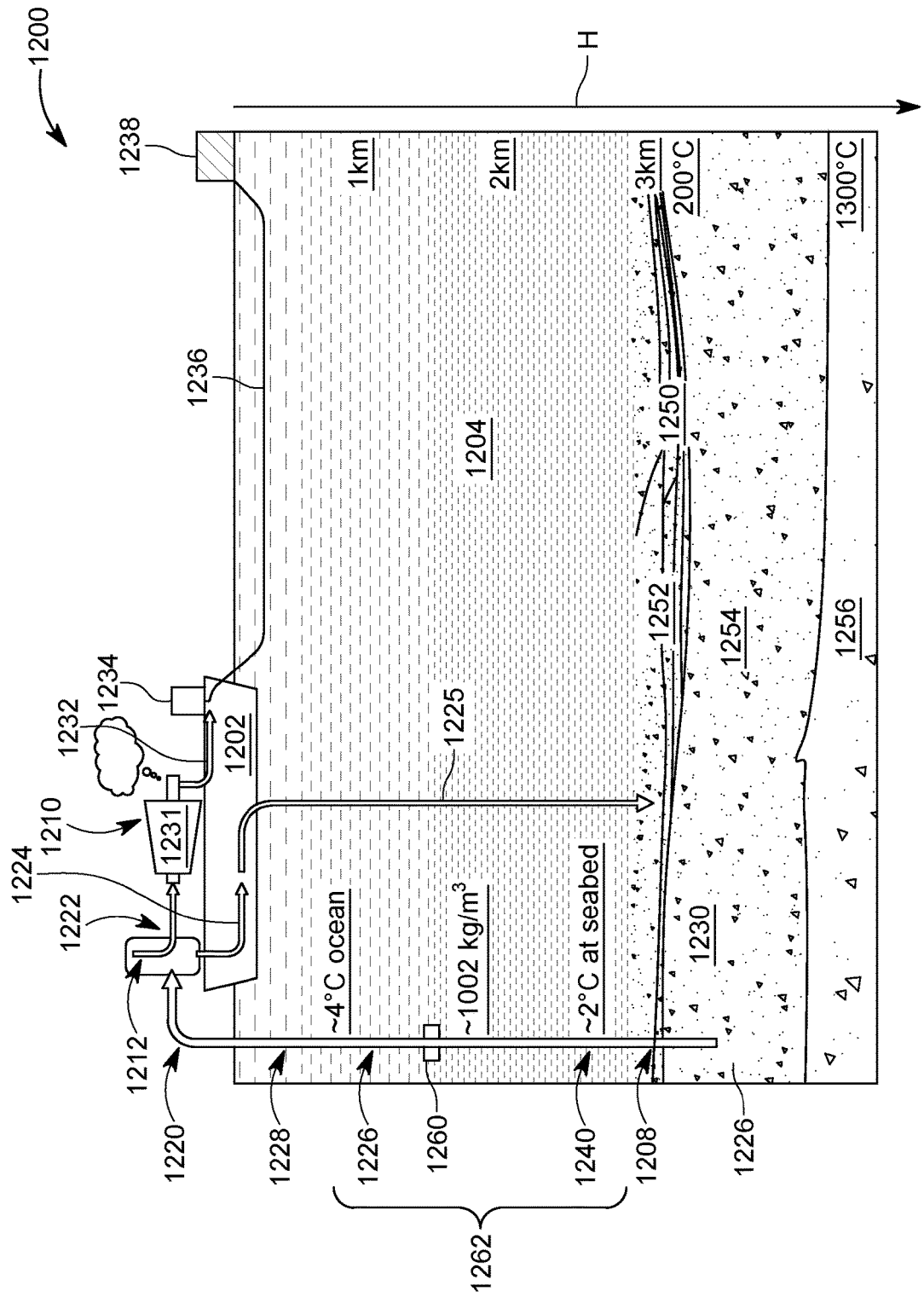
FIG. 12 is a schematic diagram of a geothermal plant configured to extract energy from a geothermal liquid from a geothermal reservoir using a power plant located on a floating platform.

An offshore geothermal well configuration is illustrated in FIG. 12 together with a geothermal plant 1200, that is configured to extract the heat from the geothermal reservoir and to transform it into other sources of energy. More specifically, the plant 1200 may include a floating platform 1202, for example, boat, vessel, oil rig, barge, etc., which is large enough to support a power plant 1210. The power plant 1210 includes at least a separation unit 1212 that separates the incoming two-phase geofluid 1220 into steam 1222 and brine 1224. Note that although the liquid 1226 that is originally extracted from the geothermal reservoir 1230 is a single-phase liquid, as this single-phase liquid 1226 advances toward the ocean surface it cools down, reduces its pressure and at a certain ocean depth 1228 becomes the two-phase geofluid 1220. The depth 1228 below sea level at which the rising hot geothermal fluid will start to form steam depends mainly on the temperature, geofluid chemistry and geofluid pressure. The latter is particularly strongly affected by reservoir permeability and will deepen through time if the reservoir pressure is not maintained by reservoir injection, which is discussed later.

Further, the power plant 1210 includes a heat conversion unit 1231, for example, a turbine, that transforms the steam 1222 into electrical power 1232. The electrical power 1232 may be stored on board, in a battery storage unit 1234 or, if the floating platform 1202 is closed enough to land, a power cable 1236 may be provided to take the electrical power all the way to a power facility 1238 on land. The brine 1224 separated from the geofluid 1220 may be discarded along a brine pipe 1225 back into the ocean floor sediments 1204.

A riser 1240 extends from the floating platform 1202 to the geothermal reservoir 1230. The riser 1240, which is preferably insulated to minimize the amount of energy lost by the geothermal liquid 1226, may be partially placed into the crust 1250, using oil and gas equipment for drilling a well 1208. FIG. 12 shows the crust 1250 having a sediment layer 1252 that sits on top of brittle basaltic oceanic crust 1254, which in turn sits on top of the ductile mantle 1256. Note that the riser 1240 enters at least the sediment layer 1252. In one embodiment, the riser 1240 further enter the brittle basaltic oceanic crust.

Figure 13:
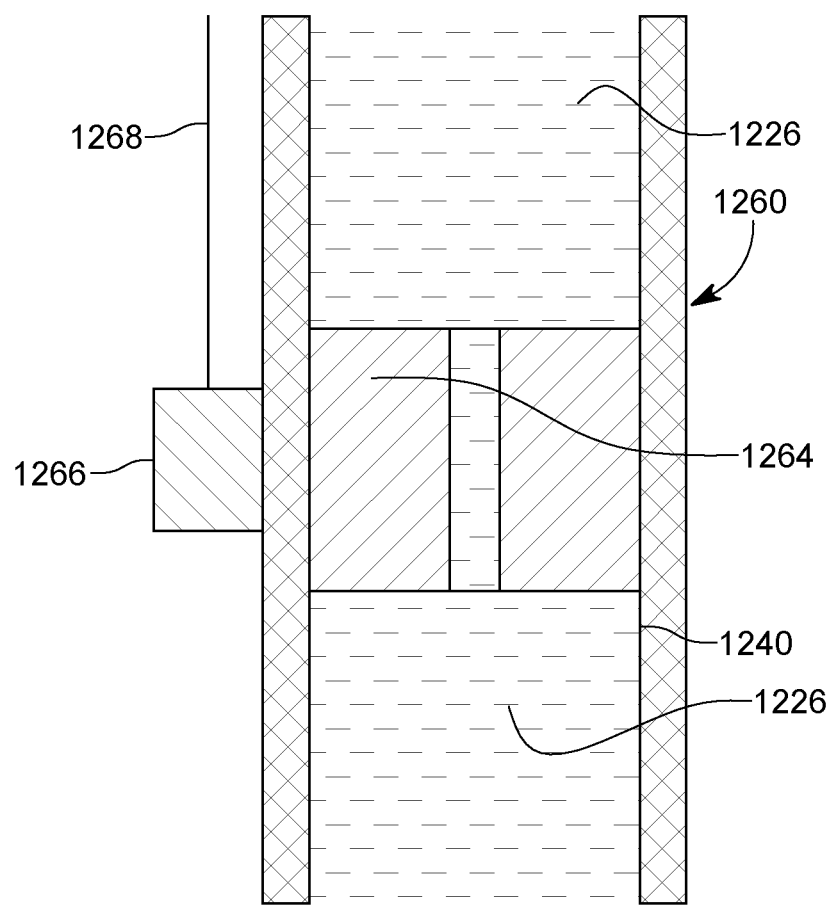
FIG. 13 illustrates the location of an electrical pump inside and outside of a riser that is used to move the geothermal liquid from the geothermal reservoir to the floating platform.

According to this embodiment, one or more electrical pumps 1260 may be installed along the riser 1226, underwater, to pump the geothermal liquid 1226 from the geothermal reservoir 1230 to the floating platform 1202. The electrical pump 1260 can be installed at any location 1262 above or on the ocean bottom and below the location 1228 where the one-phase liquid 1226 changes to the two-phase fluid 1220. In this embodiment, the electrical pump 1260 has a mechanical actuation part 1264 located inside the riser 1240, as shown in FIG. 13, and an electrical part 1266 is located outside the riser 1240, for example, attached to the riser as also shown in FIG. 13. In one embodiment, the electrical part 1266 may be located on the floating platform 1202. The mechanical actuation part 1264 may include an impeller and a motor that rotates the impeller. The electrical part 1266 may include electronics that controls the motor and one or more sensors, e.g., temperature sensor. The electrical part 1266 is electrically connected to a power source located on the floating platform 1202, through an electrical cable 1268. The electrical cable 1268 may be used not only to send electrical power, but also commands and/or data. The electrical energy and/or signals from the electrical part 1266 travel to the mechanical actuation part 1264 either through induction, so that the wall of the riser is not perforated, or through an electrical wire (not shown) that enters inside the riser through a perforation (not shown). The fact that the electronics of the electrical pump 1260 can be located outside the riser 1240, where the temperature is low, about 4° C., ensures that the pump would not fail as is the case inside a riser for oil and gas geothermal exploration, as the temperature inside the riser is typically very high. This means that the pump may be made as large as possible without concern about the extra heat generated by the mechanical actuation part 1264, as the ocean water would quickly absorb this extra heat.

Figure 15:
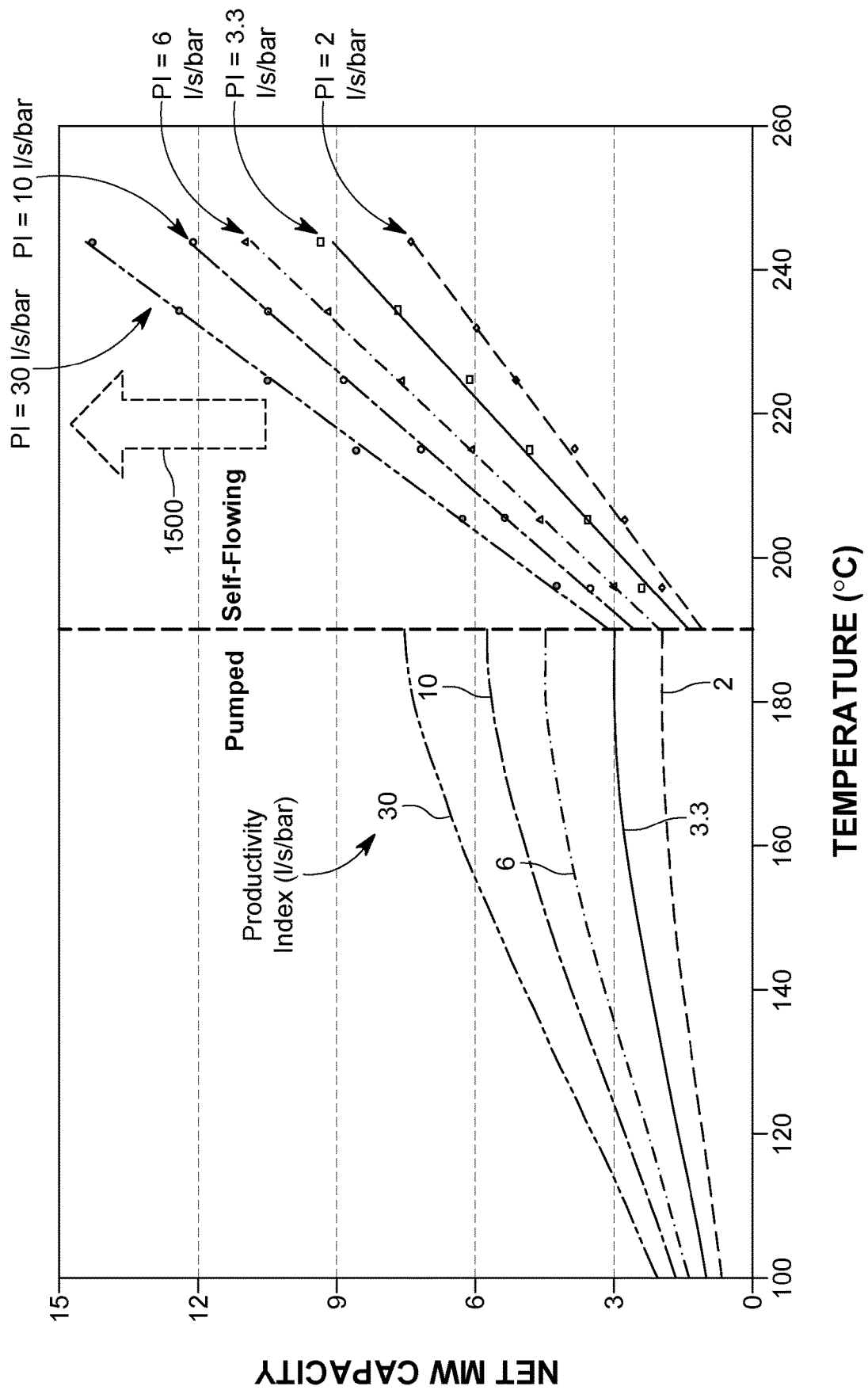
FIG. 15 illustrates the modelled net power capacity limits for a single onshore geothermal well with varying reservoir quality expressed as a productivity index.

FIGS. 14A and 14B show the estimates of the depth in the riser 1240 where the geoliquid 1226 would start to boil. The data in this figure shows that the depth in the riser where the geoliquid starts to boil will deepen with time if the reservoir is not maintained. The data also shows that doubling the reservoir permeability, from 50 mD to 100 mD is more important in keeping the flash depth 1228 at a shallow level than doubling the reservoir porosity. FIG. 15 shows the modelled net power capacity limits for a single onshore geothermal well with a varying reservoir quality expressed as a productivity index [8]. The drop in the capacity once the temperature limit for pump electrics is reached (about 190° C.) would not apply in relatively deep water settings because the electrics can be run outside the riser, where the water temperature is low. Consequently the power capacity of underwater geothermal wells flowing high temperature geofluids can be increased significantly relative to those onshore (see 1500 in the figure). Thus, according to this embodiment, it is possible to install pumps to help sustain reservoir pressure and high flow rates in deep water offshore areas for fluids whose temperatures are too high for pumping in onshore geothermal systems. Geothermal pumps work best in single phase fluid, rather than in a mixture of liquid plus steam fluids, so geothermal systems in water depths that are greater than the two phase flow depth can benefit from the pumping option. The implication is that, for the same wellbore diameter, high temperature deep water geothermal systems can deliver more energy than those onshore. In addition, deep water offshore wellbores can reach high pressures without the reduction in wellbore diameter that is required for mechanical reasons when drilling through rock. This confers additional potential for higher flow rates from offshore geothermal wells.

Figure 16:
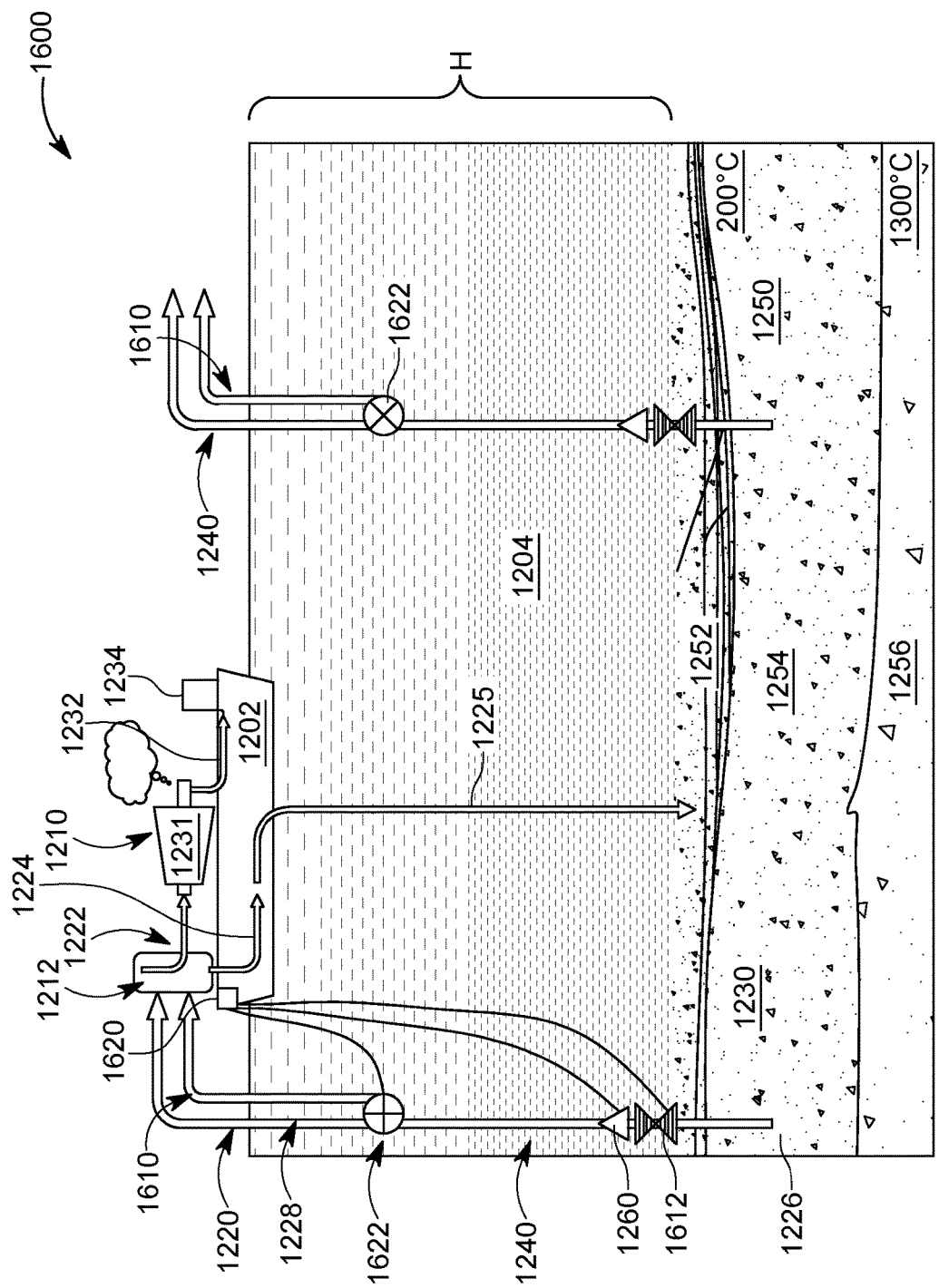
FIG. 16 illustrates a geothermal plant that has an auxiliary riser for helping the de-scaling of the main riser.

Geothermal wells onshore can suffer from scaling in the subsurface riser. This can often be remediated, but may need shut-down (with resulting loss of power) in order to undertake a work-over. In the offshore environment, according to this embodiment, it is possible to overcome this problem, as illustrated in FIG. 16. More specifically, according to this embodiment it is possible to modify the configuration of FIG. 12 to divert the flow of the geothermal liquid 1226 through an auxiliary riser 1610, which means that the main riser 1240 does not need to be shut in. FIG. 16 also shows a blow-out preventer 1612 installed at the ocean bottom, on the riser, so that if a sudden pressure increase in the riser is detected coming from the geothermal reservoir, the blow-out preventer can close the bore of the riser to prevent the pressure wave to reach the floating platform 1202. The pump 1260 and the blow-out preventer 1612 may be controlled with a computing device 1620 that is located on the floating platform.

To be able to direct the flow of the geothermal liquid 1226 either along the main raiser 1240 or along the auxiliary raiser 1610, a switching valve 1622 is installed on the main raiser, below the ocean depth 1228 where the one-phase liquid 1226 transforms into the two-phase geofluid 1220. The switching valve 1622 can be electronically controlled by the computing device 1620, so that the fluid rising up the riser 1240 can be directed either into the upper part of the main raiser 1240 or the auxiliary riser 1610.

FIG. 16 also shows a configuration in which the liquid 1226 flows initially through the lower portion of the main riser 1240, up to the switching valve 1622, after which the liquid is diverted into the auxiliary riser 1610 while the upper part of the main riser 1240 is de-scaled, for example, by pressurized bleed. The depth range H of the placement of the pump 1260 is also shown in the figure.

The inventors believe that that the flow rates of the geothermal liquid 1226 can be improved by stimulation of natural fractures. Intrusive igneous rocks are relatively brittle, and they will contain numerous natural joints and fractures due to shrinkage on cooling. The potential geothermal reservoirs 1230 also sit in relatively well understood present-day stress regimes. Owing to the thin and thermally weakened nature of the crust in these settings, natural seismicity is rarely above magnitude 5. Consequently, the deeper and hotter parts of the igneous reservoirs can be expected to respond well to fracture stimulation, with broadly predictable geometries, modest upper limits to magnitudes of induced seismicity, at locations that are relatively remote from population centers.

Figure 17:
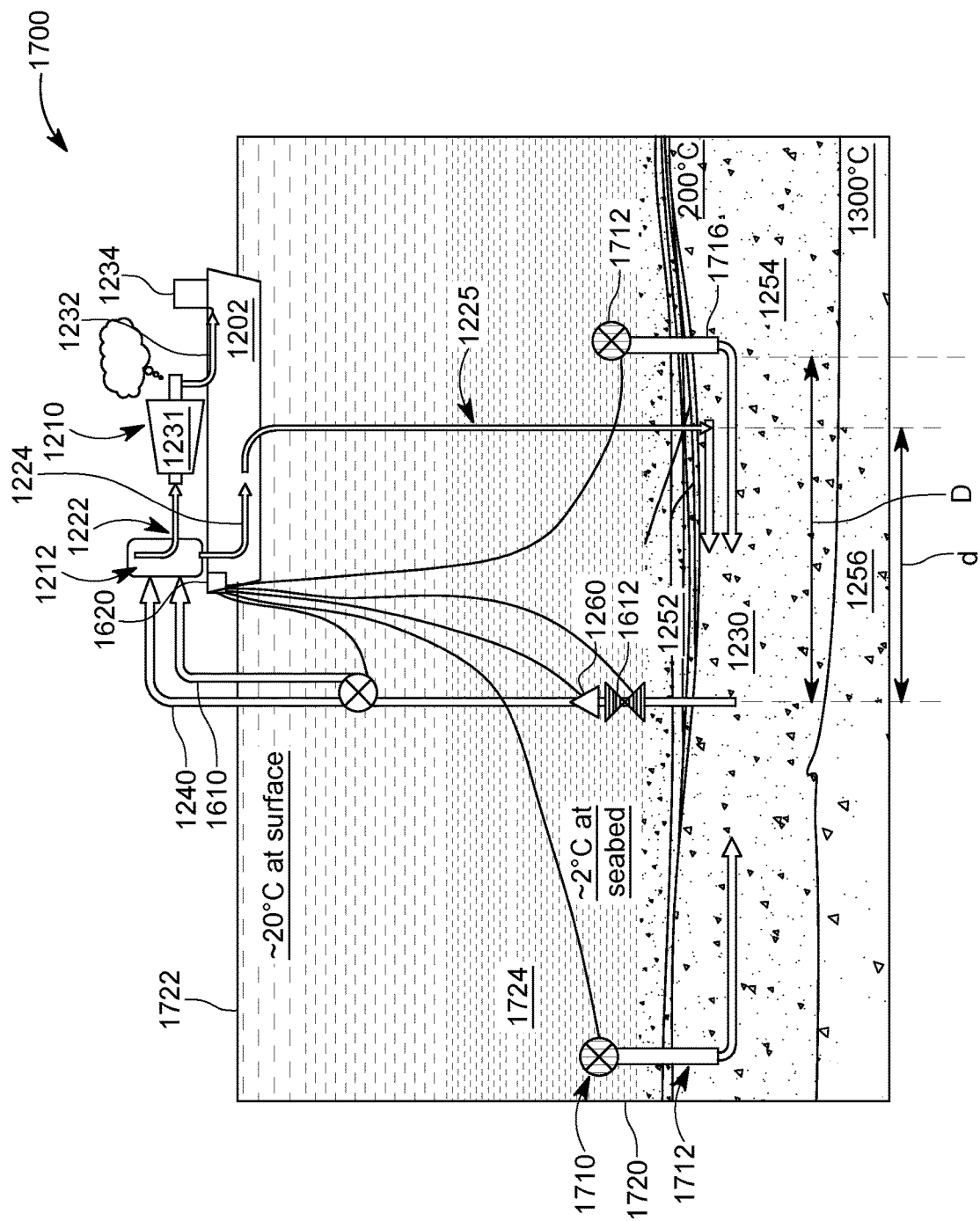
FIG. 17 illustrates a geothermal plant that uses gravity feed wells to maintain a pressure in the geothermal reservoir.

Based on these observations, according to this embodiment, it is possible to achieve geothermal reservoir injection without pumping. More specifically, the hydrostatic pressure from the column of cold ocean water can be used for reservoir pressure support and to "sweep" heat towards the riser without the cost of pumping that would normally be required onshore. FIG. 17 show such a configuration in which gravity feed valves 1710, 1714 offer reservoir pressure and flow control to corresponding gravity feed pipes 1712, 1716. Flow control could be needed, for example, if an unexpected high permeability zone allowed cool water to reach the riser. For this reason, the gravity feed valves 1710 and 1716 are also controlled by the computing device 1620.

Thus, the plant 1700 shown in this figure has, in addition to the elements of the plant 1600 shown in FIG. 16, one or more gravity feed pipes 1712 and 1716 that extend from the crust (more specifically, from a zone around the geothermal reservoir 1230) into the ocean water, just above the ocean bottom 1720. Note that the gravity feed pipes 1712 and 1716 do not extend all the way to the ocean surface 1722, as the main and auxiliary risers 1240 and 1610 do, and they also are not in fluid communication with any part of the plant on the floating platform 1202. The gravity feed pipes 1712 and 1716 extend into the ocean water just enough to capture the cold ocean water 1724 (having a temperature around 3° C. and a density of about 1002 kg/m$^3$) and they are capped with the corresponding valves 1710 and 1714. Because the water density around the head of the pipes 1712 and 1714 is about 1002 kg/m$^3$ and the density of the water in the geothermal reservoir 1230 is about 820 kg/m$^3$, by simply opening the valves 1710 and 1714, the cold water 1724 enters inside the gravity feed pipes and move into the geothermal reservoirs entirety due to the gravity, i.e., because of the weight difference between the cold and hot water. Thus, for this embodiment, there is no need to pump a fluid inside the geothermal reservoir, which is an advantage over the onshore wells. The gravity feed pipes 1712, 1716 are places in wells drilled at least a distance D from the main riser 1240, where the distance D is selected so that the cold water 1724 has enough time to heat to 200 to 300° C. before reaching the riser 1240. Those skilled in the art would understand that the distance D depends on many factors, and thus, a single value cannot be provided, as it depends on the type of reservoir, ocean bottom conditions, etc. The gravity feed rates through the gravity feed pipes can be controlled by the corresponding valves 1710 and 1714, to reconcile the reservoir permeability and geofluid pressure drawdown at the riser.

In one application, the ocean water inlet or heads of the gravity feed pipes 1712 and 1716 are raised above the ocean bottom 1720 to avoid "catching" mobile benthic organisms or sea-bed mud plumes carried by bottom currents. The inlet can be fitted with a filter (grid) designed to exclude pelagic organisms. This framework could become a site for growth of sessile organisms. Such growth is a relatively slow process in deep water settings, but could be suppressed by flushing with high salinity geothermal brine.

FIG. 17 further show that the brine 1224 separated from the two-phase fluid 1220 by the power plant 1210 can be discharged through a corresponding brine pipe 1225 closer to or into the geothermal reservoir 1230, i.e., a well is drilled into the reservoir or the crust and the brine pipe 1225 enters inside this well so that the pipe enters a given length into the crust, as shown in FIG. 17. As the temperature of the brine 1224 is between 40 to 60° C., the distance d between the brine pipe 1225 and the main riser 1240 is smaller than the distance D between the gravity feed pipe 1710 and the main riser 1240. This is so because the warm brine 1224 would need less time to heat back to 200 to 300° C., to reach the geothermal reservoir's temperature.

Figure 18:
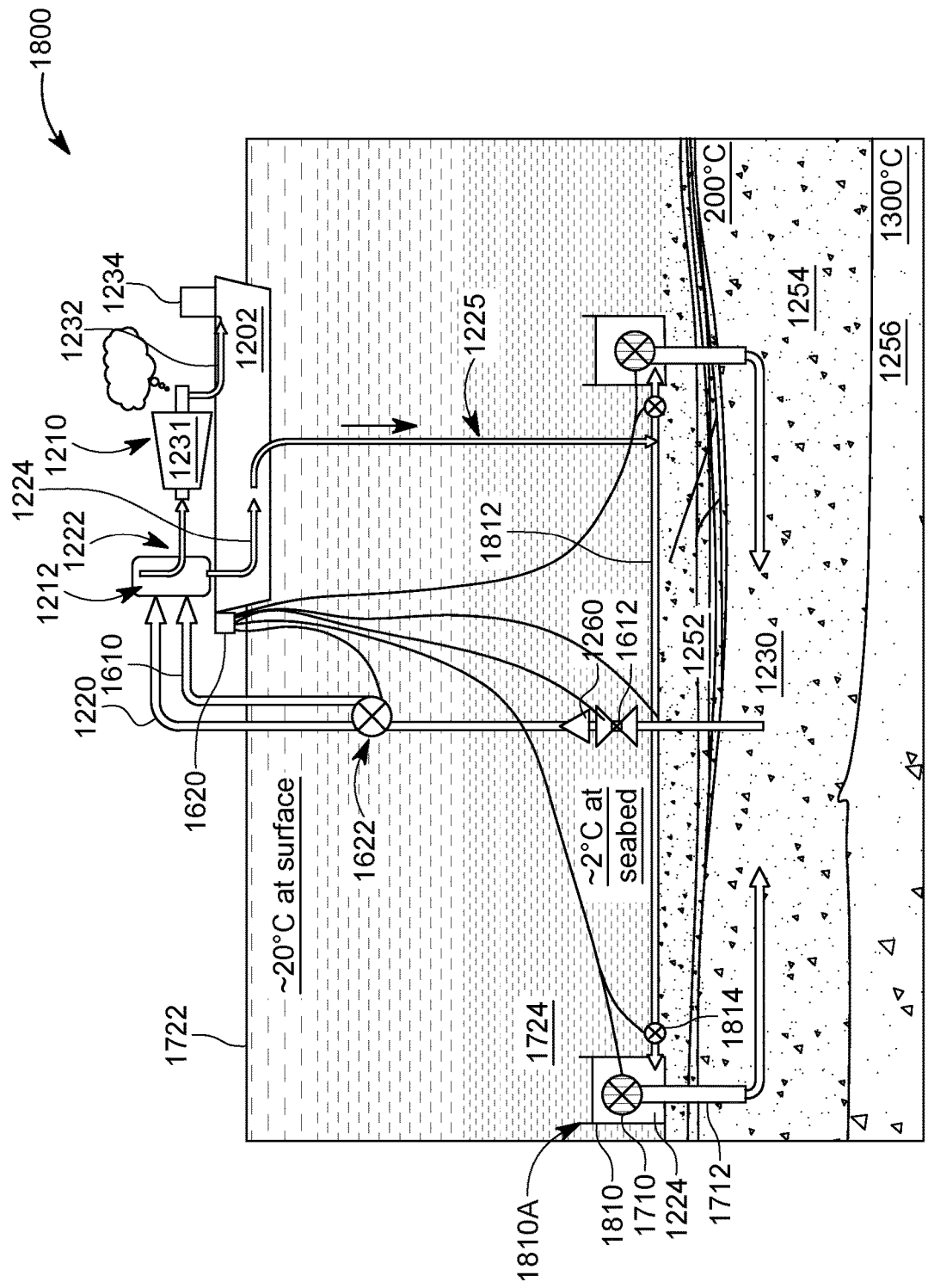
FIG. 18 illustrates a geothermal plant that uses surplus brine to fed the gravity feed wells for returning the brine back into the geothermal reservoir.

The geothermal brine 1224 that results when separating the steam 1222 can be disposed without pumping as now discussed with regard to the embodiment of FIG. 18. The plant 1800 in this figure uses a brine tank 1810 that is located around the head of the gravity feed pipe 1712. The brine tank 1810 is sized and positioned so that the entire switching valve 1710 sits inside the brine tank, as shown in the figure. In one embodiment, the brine tank is installed on the ocean bottom. The brine pipe 1225 is extended with a horizontal pipe 1812 to fluidly connect to the brine tank 1810. A valve 1814 is provided between the pipe 1812 and the tank 1810 to control the flow of the brine 1224 into the brine tank 1810. The valve 1814 is electronically controlled by the computing device 1620. The upper surface of the tank 1810 is open so that the ocean water 1724 can freely enter into the tank.

In this embodiment, the brine 1224 can be directly added into the gravity feed pipe 1712 from the brine tank 1814, with valve control, either via the pipe 1812 or via an artificial brine pool. The rim 1810A of the brine pool 1810 is designed to be higher than the inlet level for the ocean water into the pipe 1712. This gives the option, by reducing the flow through the inlet valve 1710 and increasing the flow through the brine valve 1814, to raise the level of the brine 1224 into the brine pool 1810 to cover the oceanic inlet area with brine, from time to time. This action could be used to suppress any organic growth that might form on the oceanic water inlet and, because the injected fluid during this operation would be a high salinity brine, this would also suppress formation of any organic films in the injection zone of the reservoir 1230. Note that no pumping is necessary for the brine flow as the gravity is responsible for the brine movement, as the brine is relatively dense.

Figure 19A:
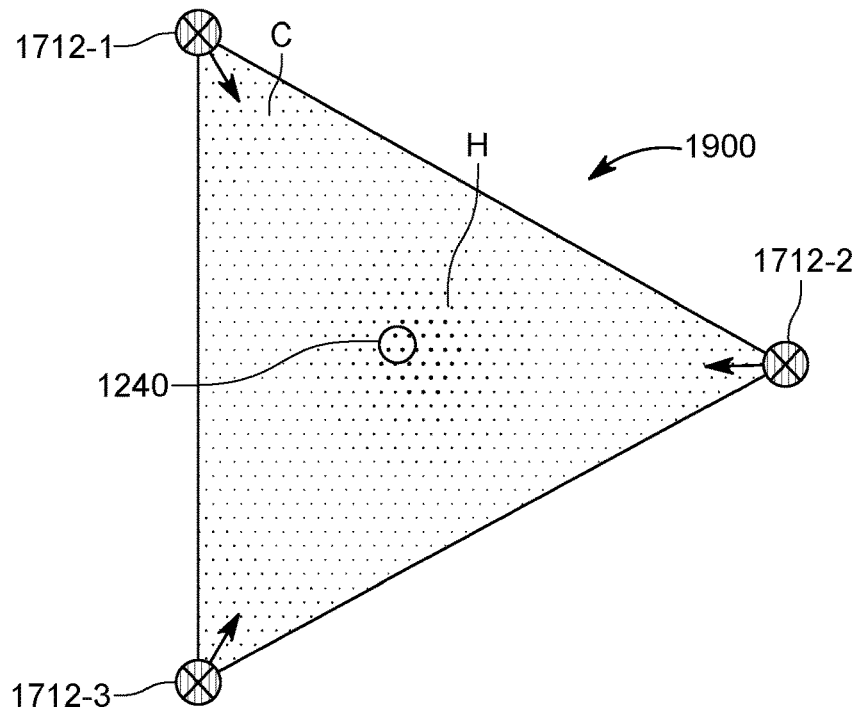
FIGS. 19A to 19D illustrate various configurations for distributing the gravity feed wells around the main riser.

Since there are no injector pump costs associated with the gravity feed pipes 1712, 1716, it may be practicable to drill patterns of the corresponding wells that deliver higher thermal recovery factors than are normally achieved in onshore geothermal fields. For example, FIG. 19A shows a triangular pattern, in which three gravity feed pipes 1712-1 to 1712-3 are placed at the corners of an equilateral triangle 1900, which is centered on the riser 1240. The three pipes 1712-1 to 1712-3 inject the cold brine at a cold temperature C, while the riser 1240 extracts the hot geothermal liquid 1226 at a hot temperature H, where C could be between 40 and 60° C. and the H could be between 200 and 300° C. Other values may be used. The cold brine pushes or sweeps the hot liquid 1226 from the corners of the triangle 1900 toward its center, where the riser 1240 is extracting the hot geothermal liquid.

Figure 19B:
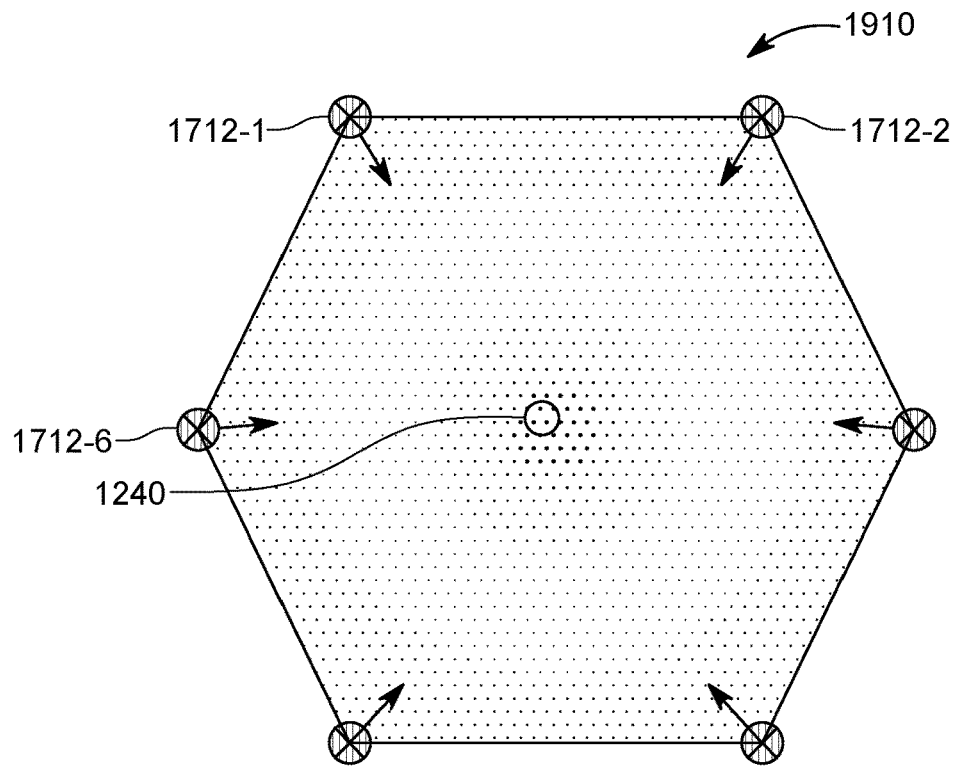
Figure 19C:
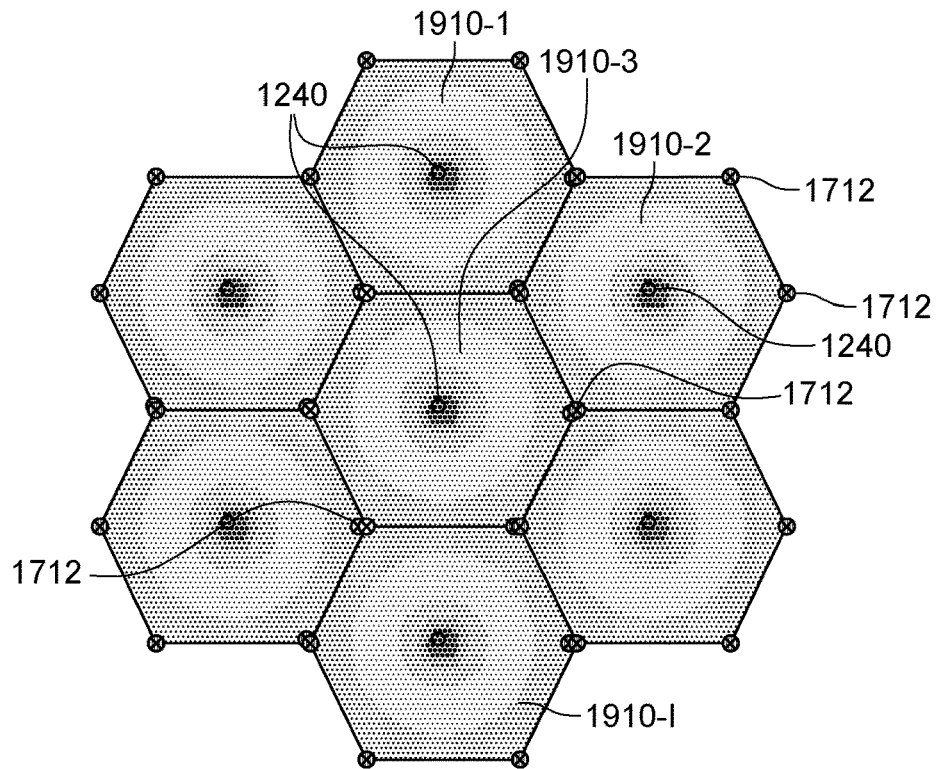
Figure 19D:
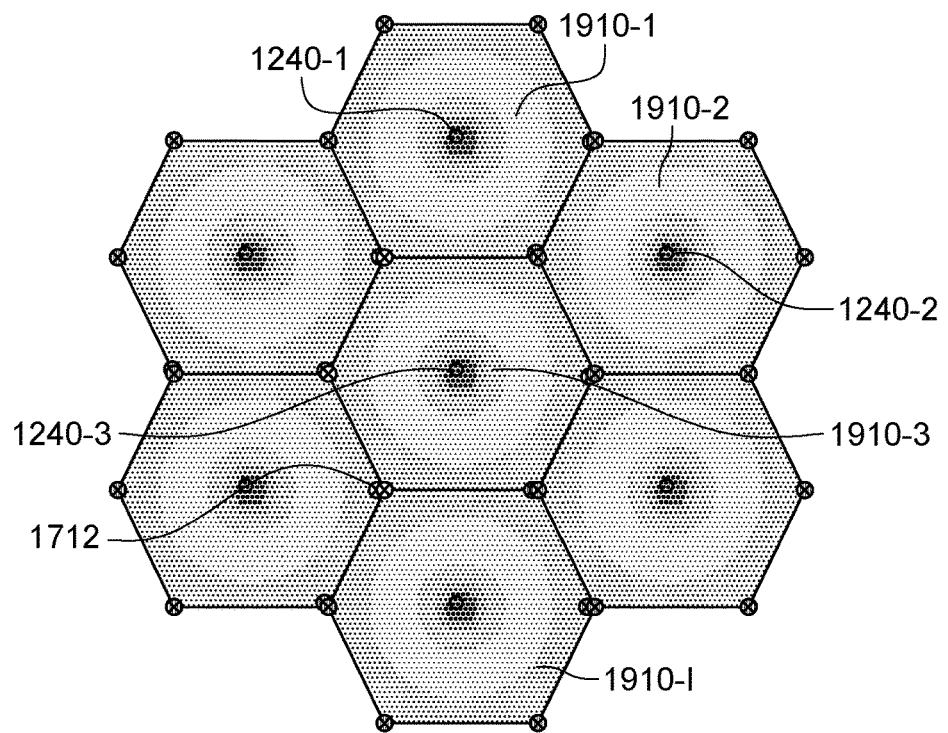

If it is desired to increase the thermal sweep, then more wells can be added, to form a hexagonal cell or pattern 1910 as shown in FIG. 19B. Other geometrical shapes may be used to place the pipes 1712. FIG. 19C illustrates another configuration in which the hexagonal cell 1910-1 is repeated so that two adjacent cells share two pipes 1712. Using this configuration, it is possible to turn off one riser 1240-3 in one cell 1910-3, but to leave open all other risers 1240-1. This may be helpful when the geothermal liquid 1226 in that cell is too cold, and the cell needs more time to heat up the liquid to return to a productive temperature.

Figure 20:
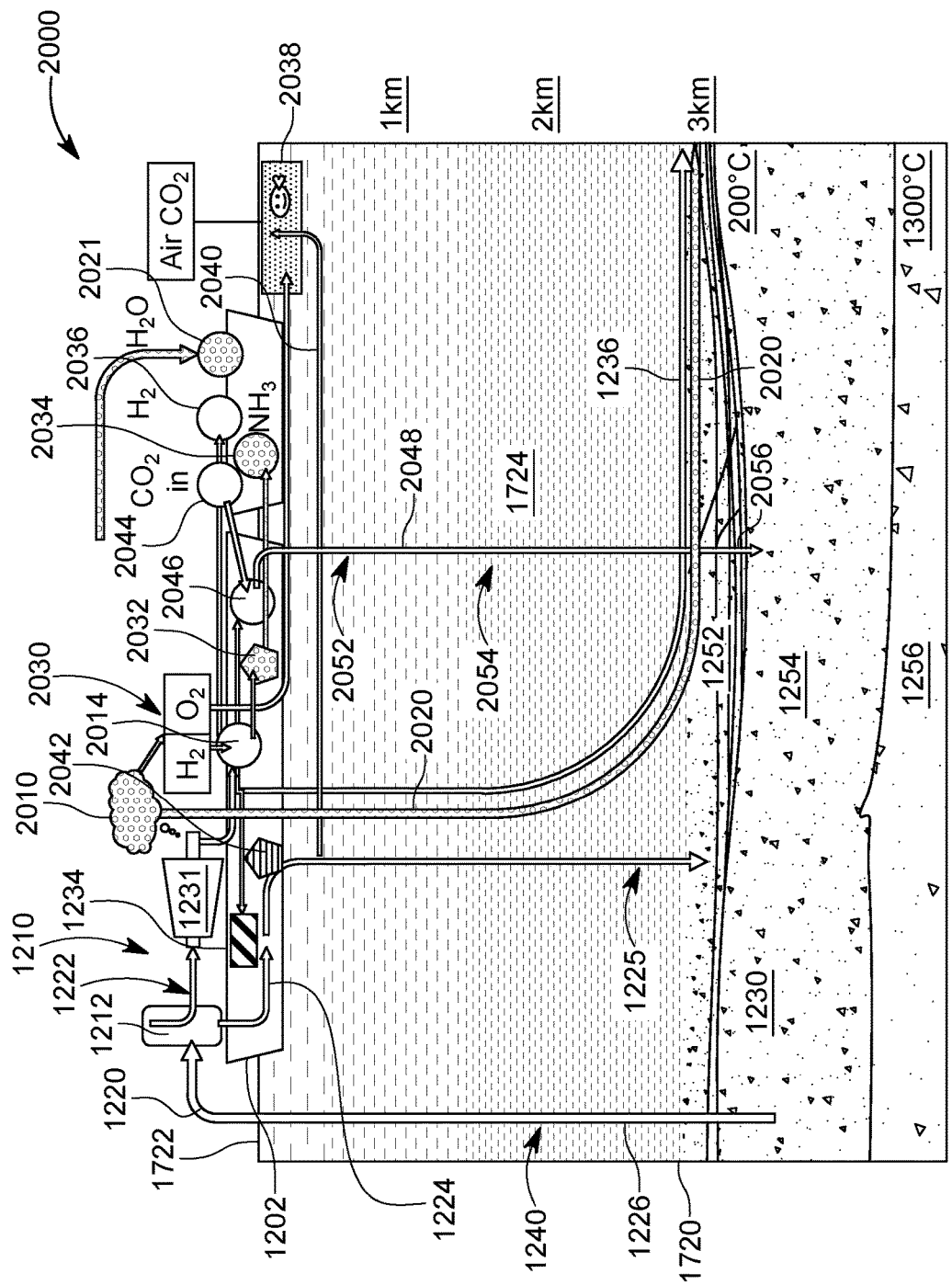
FIG. 20 illustrates a geothermal plant that uses the energy extracted from the geothermal reservoir to generate various chemicals, minerals, fresh water, and electricity.

The plant 2000 shown in FIG. 20, which includes various components from the plants previously discussed, has the capability of storing and permanently fixing carbon dioxide by mineralization in repurposed offshore geothermal wells. Note that some of the elements of the previous plants are omitted herein, but the plant 2000 can have each of the elements of the previous plants. Regarding carbon dioxide, for the temperature range of 25° C. to 0° C., the carbon dioxide changes from gas to liquid at modest pressures. Liquid carbon dioxide is more compressible than water, so at high pressures, equivalent to ocean depths in excess of 2500 m, the liquid carbon dioxide is denser than the sea water 1724. This means that carbon dioxide storage systems (wells) in deep water will be robust since they are not required to retain a buoyancy force.

Carbon dioxide is more soluble in cold water than in hot water, and so will tend to react with relatively hot rocks to form minerals. Basalts are particularly good hosts for carbon dioxide reactions, typically forming carbonate minerals at relatively rapid rates. This combination of robust storage and rapid mineralization offers an additional application for offshore geothermal wells that are not delivering geothermal fluids at sufficient flow rates or high enough temperatures.

FIG. 20 shows that used steam 2010 from the heat conversion unit 1231 can be used in various ways. One way is to condense the steam into a cooling pipe 2020 that extends from the floating platform 1202 into the ocean water 1724 and generate fresh water, which can be delivered directly to land through the pipe 2020, as shown in the figure, or pumped back on the floating platform and stored in a fresh water tank 2021 there. If the floating platform is close to land, then there is no need to pump the used steam 2010 into the pipe 2020. Another option is to use the used steam 2010 and the generated electrical power 2014 for electrolysis, in an electrolysis module 2030, to generate hydrogen $H_2$ and oxygen $O_2$. The hydrogen may be used in a reactor 2032 to convert it to ammonia, which is stored on board into an ammonia tank 2034. Alternatively, the hydrogen may be stored by itself in a hydrogen tank 2036. The generated oxygen may be used to enhance fish population, either by pumping it directly into the ocean, or into a fish tank 2038 that may be located on the floating platform or linked to the floating platform. Brine 1224 may also be deviated along a dedicated pipe 2040 to the fish tank 2038 so that nutrients are brought into the tank. Alternatively, minerals and/or chemicals from the brine 1224 may be extracted on board and stored into a mineral tank 2042. Carbon dioxide from a tank 2044 or ambient can be pumped with a pump 2046 along a carbon dioxide pipe 2048 that extends from the floating platform to a well 2056 formed into the crust 1250. As the carbon dioxide 2052 gas enters the pipe 2048 it starts to cool down due to the low temperature of the ocean water, until becoming liquid carbon dioxide 2054. As the liquid carbon dioxide 2054 is denser than the ocean water 1724, the liquid carbon dioxide can be easily discharged into one or more wells 2056, where it interacts with the existing rock and mineralizes for easy storage.

The temperature and permeability of the various structures and the flow of fluids discussed herein can be modeled to anticipate the size of the plant and its efficiency. For the temperature-depth distributions, the following reference horizons are mapped with a software platform:
  Depth to the base of the water column,
  Depth to the tops of successive layers of rock, which can include: sedimentary strata, igneous rocks, other crystalline rocks,
  Depth to the top of the asthenosphere,
  Thermal properties of the rock in each successive layer, and mapped properties may vary laterally,
  The percentage porosity in each successive rock layer, and mapped porosity may vary laterally, The temperature-depth relationships below the water column are calculated from: (1) temperature at the base of the water column, (2) thickness, thermal properties and porosity of successive layers of rock mapped, and (3) and temperature at the top of the asthenosphere. This modeling may be undertaken with Zetaware products Genesis and Trinity, using where appropriate novel rock layer properties. Where borehole data is available, Genesis is used to calibrate the rock properties to get a good match with the borehole temperature-depth relationships. Trinity is then used to extrapolate the temperature-depth relationships throughout the volume containing the mapped rock layers. As previously discussed, other software platforms may be used.

The predictive mapping of modelled permeability distributions uses the following reference horizons:
  Depth to the base of the water column,
  Depth to the tops of successive layers of rock which can include: (1) sedimentary strata, (2) igneous rocks, and (3) other crystalline rocks,
  Depth to the top of the asthenosphere,
  Thermal properties of the rock in each successive layer, and lateral variations in the distribution of these properties in each layer,
  The percentage porosity in each successive rock layer, and lateral variations in the distribution of porosity in each layer, and
  The matrix permeability in each successive rock layer, and lateral variations in the distribution of matrix permeability in each layer.

Permeabilities attributed to fractures and faults are superimposed upon the basic multi-layer rock property model. The conceptual geological fracture and fault models, plus the insights from thermomechanical models of permeability, form the main basis of this attribution. Assignment of these permeabilities may be:
  Generic vertical permeability, sufficient to account for temperature gradients in calibration wells, but with no additional orientation data;
  Generic vertical permeability, varying with strike;
  Zones of vertical permeability, varying with strike;
  Sets of fracture permeability, varying with dip and strike;
  Sets of fault permeability, varying with dip and strike;
  Specific fracture permeability, varying with dip and strike; and
  Specific fault permeability, varying with dip and strike.

Present-day stress regime data is obtained from: (1) boreholes, including image log analysis of wellbores, oriented caliper data, fracture analysis on oriented cores, (2) first motion analysis of seismicity in combination with mapped fault and fracture orientations, (3) plate motions from GPS analysis, and (4) relative plate motions from the plate model. The relationships between fracture types and geometries, combined with the data on present-day stress regimes, are used to predict the most likely orientations for permeable natural and stimulated fractures.

The above discussed embodiments disclose one or more of the following novel features:
  a method of exploration screening for geothermal resources in offshore settings;
  a geothermal development method and plant that has potential flow rates, particularly for high temperature geofluids, that are greater than those that can be achieved for equivalent geothermal systems onshore;
  a geothermal production method and plant which, through use of valve-controlled hydrostatic pressure from the water column, permits non-pumped injection of ocean water into the geothermal reservoir for pressure maintenance;

a geothermal production method and plant which, through use of valve-controlled hydrostatic pressure from the water column, which permits non-pumped injection of brine water into the geothermal reservoir for pressure maintenance. This embodiment has the additional benefit of being able to vary salinity (lower for ocean water, much higher for brine) to mitigate potential organic growth that might obstruct permeability at the injector inlets or within the reservoir;

an injection pattern designed to maximize thermal sweep from the geothermal reservoir. The injection pattern is capable of evolving during field development from triangular to hexagonal to nested hexagonal. The nested pattern offers potential to shut down or slow production from individual hexagonal thermal sweep cells to permit recovery of geofluid temperature by conduction from the rock and from the Earth's natural heat flow. This production pattern is designed to recover a much higher proportion of the geothermal reservoir heat than is normally possible at onshore geothermal fields;

a process and plant which capture and condense the steam from the turbines, to deliver desalinated water from the geofluid. Onshore, steam is normally emitted to the atmosphere, or is condensed and re-injected into the subsurface;

a process and plant which uses the nutrients from the initially separated geofluid brine to fertilise the photic zone of the water body to enhance primary productivity;

a plant that, if hydrolysis is undertaken at the site, uses the oxygen by-product to help prevent eutrophication during increased primary production; and a plant that extracts chemicals (such as alkalis, which are used in some carbon dioxide capture methods) from the initially separated geofluid brine.

After reading this disclosure, one skilled in the art would understand that there are multiple other routes to commerciality for development of underwater geothermal fields. These include:

The electricity may be exported to shore by cable;

The electricity may be used on site to generate green hydrogen by hydrolysis;

The electricity may be used on site to convert the hydrogen to green ammonia;

The electricity may be used on site to pump carbon dioxide into the subsurface for carbon storage and mineralization;

The electricity may be stored temporarily on site in batteries;

The electricity may be used on site to drive air-based water ventilation systems to prevent eutrophication in the event that hydrolysis delivering oxygen by-product is not undertaken on site; and Metals might be extracted from the initially separated geofluid brine.

The power resource estimates based on the exploration screening part of this disclosure demonstrates that that just one part of the underwater geothermal resource is of sufficient magnitude to have a material impact on helping the world reach net zero carbon dioxide by 2050. The Earth's huge underwater geothermal energy resources, through application of the inventions described here, could also provide fresh water and nutrients as beneficial by-products which can help mitigate the World's freshwater deficits and depleted fish stocks. An additional environmental benefit of geothermal exploration is that it has a relatively low demand, per unit of power generated, for other Earth resources compared with other sources of green energy. Use of Earth resources for mining and production of materials such as concrete, cement, steel, glass, plastics, composites and critical metals can have the effect of creating a large carbon footprint in another industry.

Demand for other resources, relative to current geothermal, expressed per unit of power generated, is about 300% higher for Solar PV, 200% higher for Wind and 250% higher for Hydropower. Nuclear power has a lower demand on Earth resources, but carries the potential of being able to contaminate extensive areas. Terrestrial biomass, as a direct energy source, consumes an unsustainably large amount of land area. Biomass and other wastes can provide useful energy via biogas or incineration, but only on a small scale.

The greater efficiencies likely to accrue from application of oil and gas industry technologies, using the new methods and plants described here, may mean that the resource demand, per unit of power generated, of underwater geothermal may be no greater than that of current geothermal onshore. The potential benefits of scale could mean that resource demand per unit of power generated, would reduce over time. This, combined with the potential for valuable by-products such as fresh water and nutrients, the value of commercial and geographic flexibility, with no imposition on land use, could result in underwater geothermal making a major contribution to sustainable development on this planet.

Figure 21:
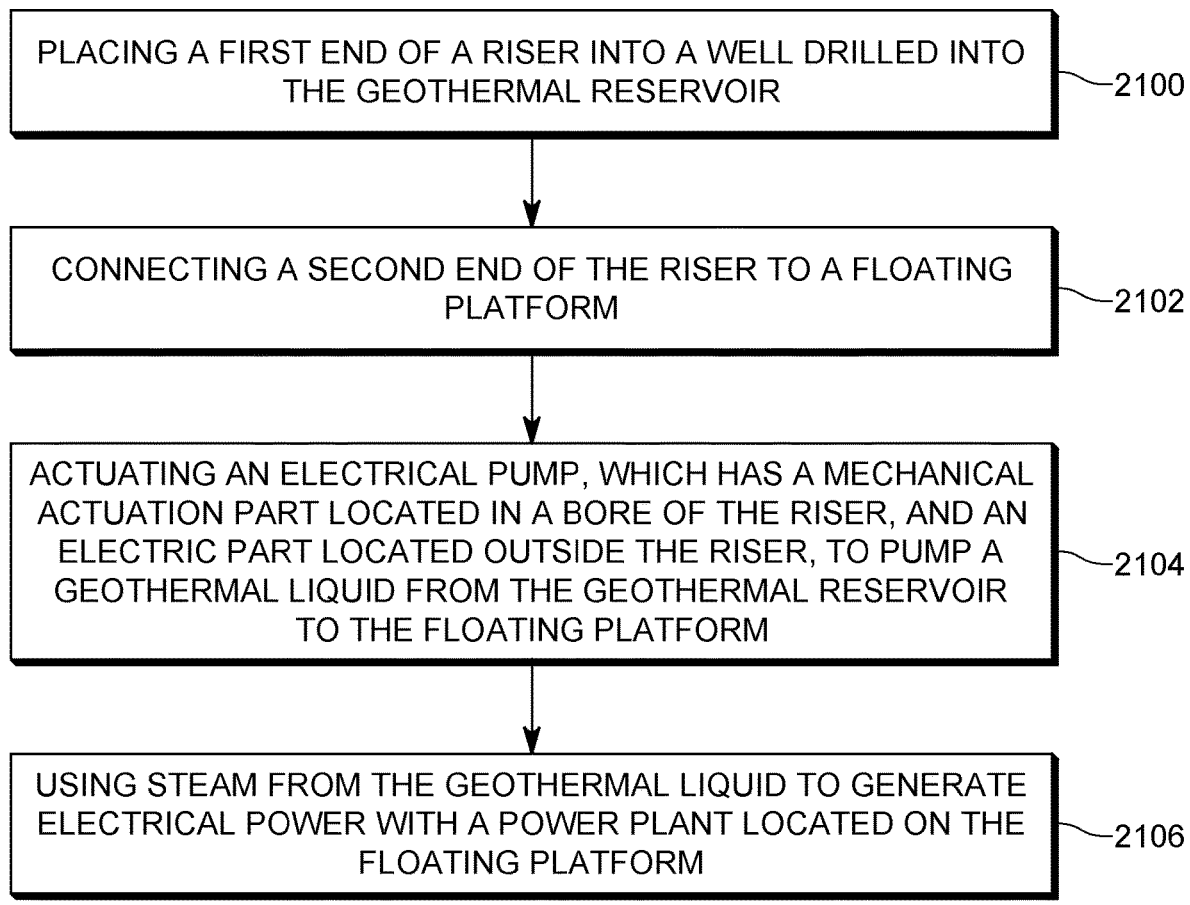
FIG. 21 is a flow chart of a method for producing electrical energy from a geothermal reservoir.

A method for extracting energy from a geothermal reservoir 1230 located below the ocean bottom is now discussed with regard to FIG. 21. The method includes a step 2100 of placing a first end of a riser into a well drilled into the geothermal reservoir, a step 2102 of connecting a second end of the riser to a floating platform, a step 2104 of actuating an electrical pump, which has a mechanical actuation part located in a bore of the riser, and an electronic part located outside the riser, to pump a geothermal liquid from the geothermal reservoir to the floating platform, and using steam from the geothermal liquid to generate electrical power with a power plant located on the floating platform. The electrical pump is placed at a depth of the riser where the geothermal liquid is in a single-phase.

The method may also include a step of placing a first end of a brine pipe into the geothermal reservoir, a step of connecting a second end of the brine pipe to the floating platform, and a step of discharging a brine from the geothermal liquid into or next to the geothermal reservoir through the brine pipe with no pump as the brine flows due exclusively to the gravity into the geothermal reservoir. The method may further include a step of separating the steam from the brine of the geothermal liquid with a separator located on the floating platform; and a step of storing the electrical power in an electrical storage unit located on the floating platform. In one application, the method may include a step of attaching a switching valve on the riser, below a position where the single-phase geothermal liquid becomes a two-phase geofluid, and a step of connecting an auxiliary riser with one end to the switching valve and with another end to the floating platform, wherein the single-phase geothermal liquid flows only through the riser when the switching valve is in a first state and through a lower part of the riser and the auxiliary riser when the switching valve is in a second state. The method may further include a step of installing a gravity feed pipe with one end into the geothermal reservoir, away from the riser, and a step of installing a gravity feed valve on a head of the gravity feed pipe to allow ocean water to enter into the gravity feed pipe and into the geothermal reservoir exclusively due to the gravity. The method may also include a step of placing an open brine tank on the ocean bottom, around the gravity feed pipe, so that the gravity feed valve is fully inside the brine tank, a step of connecting a brine pipe with one end to the floating platform and with another end to the open brine tank, and a step of discharging a brine from the geothermal liquid into the open brine tank.

The disclosed embodiments provide a geothermal plant for generating energy from a geothermal reservoir located under the ocean bottom. It should be understood that this description is not intended to limit the invention. On the contrary, the embodiments are intended to cover alternatives, modifications and equivalents, which are included in the spirit and scope of the invention as defined by the appended claims. Further, in the detailed description of the embodiments, numerous specific details are set forth in order to provide a comprehensive understanding of the claimed invention. However, one skilled in the art would understand that various embodiments may be practiced without such specific details.

Although the features and elements of the present embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

REFERENCES

The entire content of all the publications listed herein is incorporated by reference in this patent application.

[1] Hiriart, G., Prol-Ledesma, R. M., Alcocer, S. and Espindola, S. 2010. Submarine Geothermics; Hydrothermal Vents and Electricity Generation. Proceedings World Geothermal Congress 2010, Bali, Indonesia, 25-29 April.
[2] Hiriat, G. & Chavez, I. M., 2021 Submarine geothermal generation World Geothermal Congress 2021. abstract
[3] Tjetland, G., 2017. How can a ship be used to harvest energy?—Nor-Shipping 2022 (see at nor-shipping.com);
[4] Schnell, J., Hiriart, G., Nichols, K & Orcutt, J., 2015. Energy from ocean floor geothermal resources. See www.oceangeothermal.org/wp-content/uploads/2015/05/OGEF-Energy-from-Ocean-Floor-Geothermal-Resources.pdf;
[5] Allsopp, M., Santillo, D. & Johnston, P. 2007. A scientific critique of oceanic iron fertilization as a climate change mitigation strategy, Greenpeace Research Laboratories Technical Note July 2007.
[6] Rosmorduc, V., 2021, www.learn-eo.org/monitoring Atlantic storms.
[7] Becker K., Fisher, A. and Tsuji, T. 2013. New packer experiments and borehole logs in upper oceanic crust: Evidence for ridge-parallel consistency in crustal hydrogeological properties, Geochem. Geophys. Geosyst., 14, 2900-2915, doi:10.1002/ggge.20201.
[8] Sanyal S. K., Morrow, J. M. and Butler, S. J., 2007. Net power capacity of geothermal wells versus reservoir temperature—a practical perspective. PROCEEDINGS, Thirty-Second Workshop on Geothermal Reservoir Engineering, Stanford University, Stanford, California, Jan. 22-24, 2007, SGP-TR-183

What is claimed is:

1. A geothermal plant for extracting energy from a geothermal reservoir located below the ocean bottom, the geothermal plant comprising:
    a floating platform;
    a riser that extends from a well drilled into the geothermal reservoir, to the floating platform;
    an electrical pump having a mechanical actuation part located in a bore of the riser, and an electronic part located outside the riser, wherein the electrical pump is configured to pump a single-phase geothermal liquid, from the geothermal reservoir to the floating platform; and
    a power plant located on the floating platform and configured to use a steam separated from a two-phase geofluid, to generate electrical power,
    wherein the mechanical actuation part of the electrical pump is placed underwater, below a given depth of the riser, and
    wherein the given depth is a location on the riser where the single-phase geothermal liquid becomes the two-phase geofluid as the single-phase geothermal liquid advances along the riser, toward the floating platform.

2. The plant of claim 1, further comprising:
    a brine pipe that extends from the floating platform into the geothermal reservoir, wherein the brine pipe is configured to discharge a brine from the two-phase geofluid into or next to the geothermal reservoir.

3. The plant of claim 2, wherein there is no pump to pump the brine into the geothermal reservoir as the brine flows due exclusively to the gravity into the geothermal reservoir.

4. The plant of claim 2, further comprising:
    a separator located on the floating platform and configured to separate the steam from the brine; and
    an electrical storage unit configured to store the electrical power.

5. The plant of claim 1, further comprising:
    a switching valve located on the riser, below the given depth where the single-phase geothermal liquid becomes the two-phase geofluid; and
    an auxiliary riser extending from the switching valve to the floating platform,
    wherein the single-phase geothermal liquid flows only through the riser when the switching valve is in a first state and through a lower part of the riser and the auxiliary riser when the switching valve is in a second state.

6. The plant of claim 5, further comprising:
    a computing device configured to change a state of the switching valve and to control the electrical pump.

7. The plant of claim 1, further comprising:
    a gravity feed pipe configured to enter the geothermal reservoir and located away from the riser; and
    a gravity feed valve located on a head of the gravity feed pipe and configured to allow, when instructed by a computing device located on the floating platform, ocean water to enter into the gravity feed pipe exclusively due to gravity.

8. The plant of claim 7, further comprising:
    additional gravity feed pipes distributed around the riser to form a triangle or hexagon.

9. The plant of claim 7, further comprising:
an open brine tank configured to be deployed on the ocean bottom, around the gravity feed pipe, so that the gravity feed valve is fully inside the brine tank; and
a brine pipe that extends from the floating platform to the open brine tank, wherein the brine pipe is configured to discharge a brine separated from the two-phase geofluid into the open brine tank.

10. The plant of claim 1, further comprising:
an electrolysis unit located on the floating platform and configured to generate hydrogen and oxygen from the steam used by the power plant.

11. The plant of claim 10, further comprising:
an ammonia reactor located on the floating platform and configured to generate ammonia from the hydrogen generated by the electrolysis unit.

12. The plant of claim 11, further comprising:
a fish tank fluidly connected to receive a brine.

13. The plant of claim 11, further comprising:
an electrical cable configured to be connected to land to transfer the electrical power; and
a pipe fluidly connected to the steam used by the power plant and configured to condensate the steam into fresh water when in contact with ocean water and also configured to extend to the land to supply the fresh water.

14. A method for extracting energy from a geothermal reservoir located below the ocean bottom, the method comprising:
placing a first end of a riser into a well drilled into the geothermal reservoir;
connecting a second end of the riser to a floating platform;
actuating an electrical pump, which has a mechanical actuation part located in a bore of the riser, and an electronic part located outside the riser, to pump a single-phase geothermal liquid from the geothermal reservoir to the floating platform; and
using steam separated from a two-phase geofluid to generate electrical power with a power plant located on the floating platform,
wherein the mechanical actuation part of the electrical pump is placed underwater, below a given depth on the riser, and
wherein the given depth is a location on the riser where the single-phase geothermal liquid becomes the two-phase geofluid as the single-phase geothermal liquid advances along the riser, toward the floating platform.

15. The method of claim 14, further comprising:
placing a first end of a brine pipe into the geothermal reservoir;
connecting a second end of the brine pipe to the floating platform; and
discharging a brine separated from the two-phase geofluid into or next to the geothermal reservoir through the brine pipe, with no pump, as the brine flows due exclusively to the gravity into the geothermal reservoir.

16. The method of claim 15, further comprising:
separating the steam from the brine of the two-phase geofluid with a separator located on the floating platform; and
storing the electrical power in an electrical storage unit located on the floating platform.

17. The method of claim 14, further comprising:
attaching a switching valve on the riser, below a position where the single-phase geothermal liquid becomes the two-phase geofluid; and
connecting an auxiliary riser with one end to the switching valve and with another end to the floating platform,
wherein the single-phase geothermal liquid flows only through the riser when the switching valve is in a first state and through a lower part of the riser and the auxiliary riser when the switching valve is in a second state.

18. The method of claim 14, further comprising:
installing a gravity feed pipe with one end into the geothermal reservoir, away from the riser; and
installing a gravity feed valve on a head of the gravity feed pipe to allow ocean water to enter into the gravity feed pipe and into the geothermal reservoir exclusively due to the gravity.

19. The method of claim 18, further comprising:
placing an open brine tank on the ocean bottom, around the gravity feed pipe, so that the gravity feed valve is fully inside the brine tank;
connecting a brine pipe with one end to the floating platform and with another end to the open brine tank; and
discharging a brine from the two-phase geofluid into the open brine tank.

* * * * *